US011910234B2

(12) United States Patent
Ryu et al.

(10) Patent No.: US 11,910,234 B2
(45) Date of Patent: Feb. 20, 2024

(54) CONTROL OVERHEAD REDUCTION IN SIDELINK NETWORK

(71) Applicant: QUALCOMM Incorporated, San Diego, CA (US)

(72) Inventors: Jung Ho Ryu, Fort Lee, NJ (US); Junyi Li, Franklin Park, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 17/343,242

(22) Filed: Jun. 9, 2021

(65) Prior Publication Data

US 2021/0392545 A1 Dec. 16, 2021

Related U.S. Application Data

(60) Provisional application No. 63/038,018, filed on Jun. 11, 2020.

(51) Int. Cl.
*H04W 28/06* (2009.01)
*H04W 28/26* (2009.01)
(52) U.S. Cl.
CPC ........... *H04W 28/06* (2013.01); *H04W 28/26* (2013.01)

(58) Field of Classification Search
None
See application file for complete search history.

(56) References Cited

U.S. PATENT DOCUMENTS

| 2018/0146478 A1* | 5/2018 | Kim | H04W 72/23 |
| 2019/0159018 A1* | 5/2019 | Basu Mallick | H04W 8/005 |
| 2021/0297128 A1* | 9/2021 | Badic | H04W 72/20 |

FOREIGN PATENT DOCUMENTS

WO WO-2021066688 A1 * 4/2021 ........... H04B 7/0452

\* cited by examiner

*Primary Examiner* — Kodzovi Acolatse
*Assistant Examiner* — Anindita Sen
(74) *Attorney, Agent, or Firm* — Holland & Hart LLP

(57) ABSTRACT

Methods, systems, and devices for wireless communications are described. Multiple user equipments (UEs) may communicate as part of a sidelink communications system. The UEs may identify a frame for a sidelink connection. The frame may include a control portion and a data portion. One UE of a pair of UEs may receive a data signal from the other UE of the pair, and the data signal may be received in the data portion of the first instance of the frame and in the control portion of a second instance of the frame. Another pair of UEs may attempt to reserve a subsequent data portion by transmitting a request signal in the control portion in the second instance of the frame, and the second pair of UEs may receive a suppression signal from the first pair of UEs indicating ongoing data transmission by the first pair of UEs.

30 Claims, 12 Drawing Sheets

CONTROL OVERHEAD REDUCTION IN SIDELINK NETWORK

CROSS REFERENCE

The present Application for Patent claims the benefit of U.S. Provisional Patent Application No. 63/038,018 by Ryu et al., entitled "CONTROL OVERHEAD REDUCTION IN SIDELINK NETWORK," filed Jun. 11, 2020, assigned to the assignee hereof, and expressly incorporated by reference herein.

FIELD OF TECHNOLOGY

The following relates generally to wireless communications and more specifically to control overhead reduction in sidelink network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Two or more UEs may operate using sidelink communication in a wireless system using shared spectrum (e.g., unlicensed spectrum or shared licensed spectrum). These UEs may operate without a central coordinating entity (e.g., without an access connection to a base station that manages and schedules the sidelink communications). As such, the UEs may contend for access to the shared spectrum, and a communications structure for sidelink communication may allocate a control portion dedicated for contention and control message exchange, and a data portion dedicated for transmitting associated data.

SUMMARY

The described techniques relate to improved methods, systems, devices, and apparatuses that support control overhead reduction in sidelink network. Generally, the described techniques provide for managing contention in sidelink communications in cases where base station involvement is minimal, and when contention or control resources in a control portion of a frame are not fully used. Multiple user equipments (UEs) may communicate as part of a sidelink communications system. The UEs may identify a frame for a sidelink connection. The frame may include a control portion and a data portion. The control portion may include a set of control regions, where each control region includes a first transmission time interval (TTI) for channel reservation requests for a group of UEs and a second TTI for channel reservation responses for the group of UEs. One pair of sidelink UEs may communicate high priority data, and a second pair of sidelink UEs may data with a lower priority than the high priority data.

One UE of a pair of UEs may receive a data signal from the other UE of the pair, and the data signal may be received in the data portion of the first instance of the frame and in the control portion of a second instance of the frame. Another pair of UEs may attempt to reserve a subsequent data portion by transmitting a request signal in the control portion in the second instance of the frame, and the second pair of UEs may receive a suppression signal from the first pair of UEs indicating ongoing data transmission by the first pair of UEs.

A method of wireless communications at a first UE is described. The method may include identifying, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, determining that a second UE has obtained access to the sidelink connection for communications with the first UE in a first instance of the frame, and receiving, from the second UE, a data signal in the data portion of the first instance of the frame and in at least a part of the control portion of a second instance of the frame that follows the first instance.

An apparatus for wireless communications at a first UE is described. The apparatus may include a processor, memory coupled with the processor, and instructions stored in the memory. The instructions may be executable by the processor to cause the apparatus to identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, determine that a second UE has obtained access to the sidelink connection for communications with the first UE in a first instance of the frame, and receive, from the second UE, a data signal in the data portion of the first instance of the frame and in at least a part of the control portion of a second instance of the frame that follows the first instance.

Another apparatus for wireless communications at a first UE is described. The apparatus may include means for identifying, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, determining that a second UE has obtained access to the sidelink connection for communications with the first UE in a first instance of the frame, and receiving, from the second UE, a data signal in the data portion of the first instance of the frame and in at least a part of the control portion of a second instance of the frame that follows the first instance.

A non-transitory computer-readable medium storing code for wireless communications at a first UE is described. The code may include instructions executable by a processor to identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, determine that a second UE has obtained access to the sidelink connection for communications with the first UE in a first instance of the frame, and receive, from the second UE, a data signal in the data portion of the first instance of the frame and in at least a part of the control portion of a second instance of the frame that follows the first instance.

Some examples of the method, apparatuses, and non-transitory computer-readable medium described herein may further include operations, features, means, or instructions for determining, in the at least a part of the control portion of the second instance of the frame, a presence of interference on the sidelink connection, and transmitting, based on determining the presence of the interference, a signal indicating that the first UE may be receiving data from the second UE.

Some examples of the method, apparatuses, and non-transitory computer-readable medium described herein may further include operations, features, means, or instructions for determining that a level of the interference satisfies an interference threshold, where the signal indicating that the first UE may be receiving data from the second UE may be transmitted based on the level of the interference satisfying the interference threshold.

Some examples of the method, apparatuses, and non-transitory computer-readable medium described herein may further include operations, features, means, or instructions for receiving, at the first UE, a channel reservation request addressed to a third UE and from a fourth UE, where the presence of the interference may be determined based on the received channel reservation request.

In some examples of the method, apparatuses, and non-transitory computer-readable medium described herein, the channel reservation request and the data signal may be received at least in part during a same time interval.

Some examples of the method, apparatuses, and non-transitory computer-readable medium described herein may further include operations, features, means, or instructions for switching from a receive mode to a transmit mode based on determining the presence of the interference, the signal indicating that the first UE may be receiving data from the second UE transmitted in the transmit mode.

Some examples of the method, apparatuses, and non-transitory computer-readable medium described herein may further include operations, features, means, or instructions for identifying a length of the signal indicating that the first UE may be receiving data from the second UE based on the interference.

Some examples of the method, apparatuses, and non-transitory computer-readable medium described herein may further include operations, features, means, or instructions for determining a receive power for the interference, the length of the signal determined based on the determined receive power for the interference.

In some examples of the method, apparatuses, and non-transitory computer-readable medium described herein, the signal indicating that the first UE may be receiving data from the second UE includes a predetermined sequence.

In some examples of the method, apparatuses, and non-transitory computer-readable medium described herein, determining that the second UE may have obtained access to the sidelink connection for communications with the first UE may include operations, features, means, or instructions for receiving, from the second UE, a channel reservation request addressing the first UE.

Some examples of the method, apparatuses, and non-transitory computer-readable medium described herein may further include operations, features, means, or instructions for transmitting, in response to the received channel reservation request, a channel reservation response addressing the second UE.

In some examples of the method, apparatuses, and non-transitory computer-readable medium described herein, each control region of the set of control regions corresponds to a priority level of a set of priority levels.

In some examples of the method, apparatuses, and non-transitory computer-readable medium described herein, the sidelink connection may be in an unlicensed radio frequency spectrum band.

In some examples of the method, apparatuses, and non-transitory computer-readable medium described herein, the sidelink connection may be in a shared licensed radio frequency spectrum band.

In some examples of the method, apparatuses, and non-transitory computer-readable medium described herein, the first UE lacks an access link to a base station.

In some examples of the method, apparatuses, and non-transitory computer-readable medium described herein, the sidelink connection includes a PC5 vehicle-to-vehicle interface of a cellular network.

A method of wireless communications at a second UE is described. The method may include identifying, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, obtaining access to the sidelink connection based on a successful channel access procedure in a first instance of the frame, and transmitting, to a first UE, a data signal in the data portion of the first instance of the frame and in at least a part of the control portion of a second instance of the frame that follows the first instance.

An apparatus for wireless communications at a second UE is described. The apparatus may include a processor, memory coupled with the processor, and instructions stored in the memory. The instructions may be executable by the processor to cause the apparatus to identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, obtain access to the sidelink connection based on a successful channel access procedure in a first instance of the frame, and transmit, to a first UE, a data signal in the data portion of the first instance of the frame and in at least a part of the control portion of a second instance of the frame that follows the first instance.

Another apparatus for wireless communications at a second UE is described. The apparatus may include means for identifying, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, obtaining access to the sidelink connection based on a successful channel access procedure in a first instance of the frame, and transmitting, to a first UE, a data signal in the data portion of the first instance of the frame and in at least a part of the control portion of a second instance of the frame that follows the first instance.

A non-transitory computer-readable medium storing code for wireless communications at a second UE is described. The code may include instructions executable by a processor to identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, obtain access to the sidelink connection based on a successful channel access procedure in a first instance of the frame, and transmit, to a first UE, a data signal in the data portion of the first instance of the frame and in at least a part of the control portion of a second instance of the frame that follows the first instance.

Some examples of the method, apparatuses, and non-transitory computer-readable medium described herein may further include operations, features, means, or instructions for transmitting, based on the obtaining access to the sidelink connection, a channel reservation request addressing the first UE, and receiving, in response to the transmitted channel reservation request, a channel reservation response from the first UE, the data signal transmitted based on receiving the channel reservation response.

In some examples of the method, apparatuses, and non-transitory computer-readable medium described herein, each control region of the set of control regions corresponds to a priority level of a set of priority levels.

In some examples of the method, apparatuses, and non-transitory computer-readable medium described herein, the sidelink connection may be in an unlicensed radio frequency spectrum band.

In some examples of the method, apparatuses, and non-transitory computer-readable medium described herein, the sidelink connection may be in a shared licensed radio frequency spectrum band.

In some examples of the method, apparatuses, and non-transitory computer-readable medium described herein, the first UE lacks an access link to a base station.

In some examples of the method, apparatuses, and non-transitory computer-readable medium described herein, the sidelink connection includes a PC5 vehicle-to-vehicle interface of a cellular network.

A method of wireless communications at a third UE is described. The method may include identifying, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, receiving, in the first TTI of the frame, a channel reservation request from a fourth UE, receiving, from a first UE, a signal indicating that the first UE is receiving data from a second UE during at least a part of the control portion of the frame, and determining to refrain from transmitting a channel reservation response to the fourth UE in response to the received channel reservation request based on receiving the signal indicating that the first UE is receiving data from a second UE.

An apparatus for wireless communications at a third UE is described. The apparatus may include a processor, memory coupled with the processor, and instructions stored in the memory. The instructions may be executable by the processor to cause the apparatus to identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, receive, in the first TTI of the frame, a channel reservation request from a fourth UE, receive, from a first UE, a signal indicating that the first UE is receiving data from a second UE during at least a part of the control portion of the frame, and determine to refrain from transmitting a channel reservation response to the fourth UE in response to the received channel reservation request based on receiving the signal indicating that the first UE is receiving data from a second UE.

Another apparatus for wireless communications at a third UE is described. The apparatus may include means for identifying, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, receiving, in the first TTI of the frame, a channel reservation request from a fourth UE, receiving, from a first UE, a signal indicating that the first UE is receiving data from a second UE during at least a part of the control portion of the frame, and determining to refrain from transmitting a channel reservation response to the fourth UE in response to the received channel reservation request based on receiving the signal indicating that the first UE is receiving data from a second UE.

A non-transitory computer-readable medium storing code for wireless communications at a third UE is described. The code may include instructions executable by a processor to identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, receive, in the first TTI of the frame, a channel reservation request from a fourth UE, receive, from a first UE, a signal indicating that the first UE is receiving data from a second UE during at least a part of the control portion of the frame, and determine to refrain from transmitting a channel reservation response to the fourth UE in response to the received channel reservation request based on receiving the signal indicating that the first UE is receiving data from a second UE.

Some examples of the method, apparatuses, and non-transitory computer-readable medium described herein may further include operations, features, means, or instructions for monitoring for channel reservation requests during the first TTI based on the identified frame.

In some examples of the method, apparatuses, and non-transitory computer-readable medium described herein, the received signal indicating that the first UE may be receiving data from the second UE includes a predetermined sequence.

In some examples of the method, apparatuses, and non-transitory computer-readable medium described herein, each control region of the set of control regions corresponds to a priority level of a set of priority levels.

In some examples of the method, apparatuses, and non-transitory computer-readable medium described herein, the sidelink connection may be in an unlicensed radio frequency spectrum band.

In some examples of the method, apparatuses, and non-transitory computer-readable medium described herein, the sidelink connection may be in a shared licensed radio frequency spectrum band.

In some examples of the method, apparatuses, and non-transitory computer-readable medium described herein, the first UE lacks an access link to a base station.

In some examples of the method, apparatuses, and non-transitory computer-readable medium described herein, the sidelink connection includes a PC5 vehicle-to-vehicle interface of a cellular network.

A method of wireless communications at a fourth user equipment is described. The method may include identifying, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, transmitting, in the first TTI of the frame, a channel reservation request to a third UE, receiving, from a first UE, a signal indicating that the first UE is receiving data from a second UE during at least a part of the control portion of the frame, and determining to refrain from transmitting a data signal to the third UE in response to the received signal indicating the first UE is receiving data from a second UE.

An apparatus for wireless communications at a fourth user equipment is described. The apparatus may include a processor, memory coupled with the processor, and instructions stored in the memory. The instructions may be executable by the processor to cause the apparatus to identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, transmit, in the first TTI of the frame, a channel reservation request to a third UE, receive, from a first UE, a signal indicating that the first UE is receiving data from a second UE during at least a part of the control portion of the frame, and determine to refrain from transmitting a data signal to the third UE in response to the received signal indicating the first UE is receiving data from a second UE.

Another apparatus for wireless communications at a fourth user equipment is described. The apparatus may include means for identifying, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, transmitting, in the first TTI of the frame, a channel reservation request to a third UE, receiving, from a first UE, a signal indicating that the first UE is receiving data from a second UE during at least a part of the control portion of the frame, and determining to refrain from transmitting a data signal to the third UE in response to the received signal indicating the first UE is receiving data from a second UE.

A non-transitory computer-readable medium storing code for wireless communications at a fourth user equipment is described. The code may include instructions executable by a processor to identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, transmit, in the first TTI of the frame, a channel reservation request to a third UE, receive, from a first UE, a signal indicating that the first UE is receiving data from a second UE during at least a part of the control portion of the frame, and determine to refrain from transmitting a data signal to the third UE in response to the received signal indicating the first UE is receiving data from a second UE.

In some examples of the method, apparatuses, and non-transitory computer-readable medium described herein, the frame may include operations, features, means, or instructions for determining to refrain from transmitting the data signal to the third UE in a second frame.

In some examples of the method, apparatuses, and non-transitory computer-readable medium described herein, the received signal indicating that the first UE may be receiving data from the second UE includes a predetermined sequence.

In some examples of the method, apparatuses, and non-transitory computer-readable medium described herein, each control region of the set of control regions corresponds to a priority level of a set of priority levels.

In some examples of the method, apparatuses, and non-transitory computer-readable medium described herein, the sidelink connection may be in an unlicensed radio frequency spectrum band.

In some examples of the method, apparatuses, and non-transitory computer-readable medium described herein, the sidelink connection may be in a shared licensed radio frequency spectrum band.

In some examples of the method, apparatuses, and non-transitory computer-readable medium described herein, the first UE lacks an access link to a base station.

DETAILED DESCRIPTION

Figure 1:
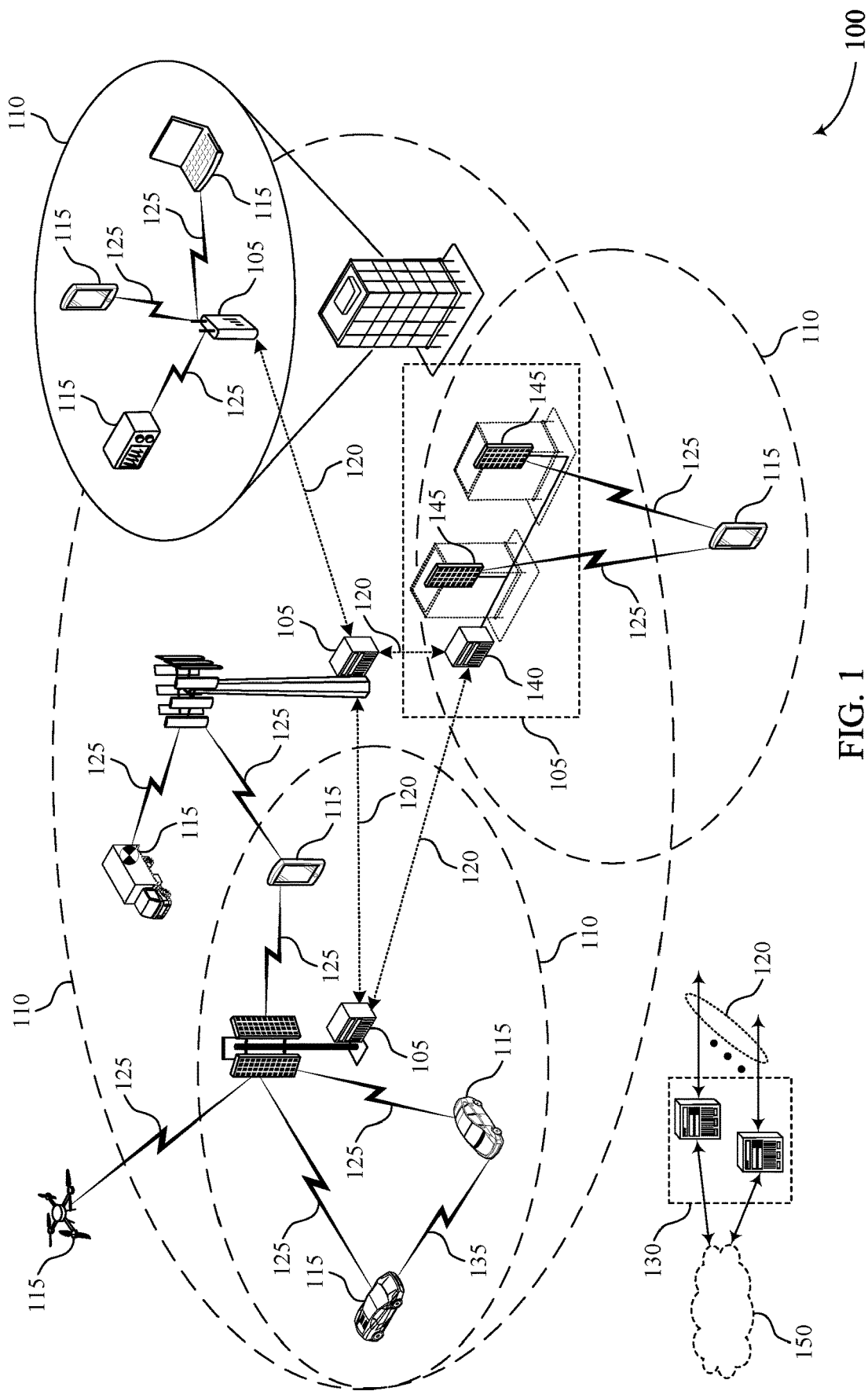
FIG. 1 illustrates an example of a system for wireless communications that supports control overhead reduction in sidelink network in accordance with aspects of the present disclosure.

Two or more user equipments (UEs) may operate using sidelink communication, where the UEs communicate directly to other UEs without relaying messages through a base station or the network. The sidelink communication system may include operation on a shared spectrum (e.g., unlicensed spectrum or shared licensed spectrum). In some cases, a base station may coordinate sidelink communications between UEs to avoid interference. In other cases, UEs communicating over sidelink may operate without a central coordinating entity (e.g., the base station). In these cases, the UEs may contend for access to the shared spectrum. A communication structure for sidelink communications may include a control portion, which the UEs may use for contention and transmission of control message, and a data portion, which the UEs may use to transmit data messages based on the results of the contention.

As such, UEs may contend for access (through some contention-based channel access procedure) to the shared spectrum, then communicate during the data region if they get access. There may be multiple pairs of sidelink UEs, where each pair of UEs contend for access, and then the pair of UEs may transmit data messages during the data portion. The communication structure may repeat, with a next control portion beginning after the data portion.

Each pair of UEs may stop transmitting data at the beginning of the next control region so that other pairs of UEs may use the control portion to contend for access to the shared spectrum in the next corresponding data region. The control region may be designed to be a relatively large amount of the total frame size (control region plus data region) to allow access by many pairs of UEs. However, in some cases with only a few active sidelink UE pairs, the next control portion may not be used frequently, as contention may not be performed often by different UE pairs. As such, the control portion may represent significant amount of unused or inefficiently used communication resources.

Rather than letting the control resources in the sidelink resource set go unused, a first sidelink pair that has won contention for the shared spectrum during a prior control portion may continue communicating data into the next control region, rather than stopping communications upon reaching the next control portion. For example, in a sidelink system with multiple pairs of transmitting and receiving UEs, a transmit/receive pair with high priority data may use the control symbols for data, rather than halting data transmission to perform contention again in each control portion.

In some cases, a lower priority UE (e.g., of a second transmit/receive pair) may attempt to claim the shared spectrum by transmitting a request message in the control region. The request message may be an example of a channel reservation request message. The lower priority UE may be a part of a secondary pair of UEs, where the secondary pair of UEs are based on the lower priority. A second pair of UEs may correspond to higher priority data, and may be defined or discussed as a primary pair of UEs. The primary pair of UEs may receive the request message, and respond with a suppression message to suppress the second pair from transmitting. The suppression message may indicate that the priority pair will continue to transmit during the control portion and at least the next data portion, and the secondary pair is to refrain from transmitting during the next data portion.

Further, the primary pair of UEs may determine to only transmit a suppression message when the primary pair detects a strong level of interference (e.g., above a threshold level of interference) from the secondary pair. For example, the primary pair of UEs may receive the request message from the secondary, lower priority UEs. The primary set of UEs may determine that the interference from the secondary set is less than a threshold. The primary set of UEs may determine not to transmit a suppression message, as the data that will be transmitted to the second pair of UEs in the next data portion may not cause interference to the high priority data transmitted by the primary pair of UEs in the next data portion.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to control overhead reduction in sidelink network.

FIG. 1 illustrates an example of a wireless communications system 100 that supports control overhead reduction in sidelink network in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Multiple user equipments UEs 115 may communicate as part of a sidelink communications system, in cases where a base station 105 may not be involved in allocating resources or managing communications for different pairs of sidelink UEs 115. The UEs 115 may identify a frame for a sidelink connection. The frame may include a control portion and a data portion. The control portion may include a set of control regions, where each control region includes a first TTI for channel reservation requests for a group of UEs 115 and a second TTI for channel reservation responses for the group of UEs 115.

A channel reservation request (which may also be referred to as a request to send, request for channel access, request frame, request, etc.) may be a message that includes an indication of request by a wireless device to reserve resources on which to transmit data, in order to avoid data collisions and frame collisions. The channel reservation request may have similar properties to a request to send (RTS) signal as used in Wi-Fi. For example, the channel reservation request message may include several fields, including at least an indication of a duration for which the medium or channel is sought to be reserved by the requesting UE, a receiver address for the recipient UE, and a transmitter address for the transmitting UE. A channel reservation response (which may also be referred to as a clear to send (CTS), response to request for channel access, response, response frame, etc.) may be sent by a receiver indicated by the channel reservation request (e.g., by the receiver address field) in response to the channel reservation request. A channel reservation response may be an example of a response message that includes an indication of whether the wireless device that transmitted the RTS is able to transmit data during a set of resources. For example, the CTS message may indicate that the wireless device may transmitting data without causing interference or without a receiving wireless device experiencing interference in attempting to receive the data. In some cases, the channel reservation response message may include several fields, including at least an indication of a duration for which the medium or channel is sought to be reserved by the requesting UE and a receiver address for the recipient UE.

One UE 115 of a pair of UEs 115 may receive a data signal from the other UE 115 of the pair, and the data signal may be received in the data portion of the first instance of the frame and in the control portion of a second instance of the frame. Another pair of UEs 115 may attempt to reserve a subsequent data portion for data transmission by the second pair of UEs 115 by transmitting a request signal in the control portion in the second instance of the frame, and the second pair of UEs 115 may receive a suppression signal from the first pair of UEs indicating ongoing data transmission by the first pair of UEs 115.

Figure 2:
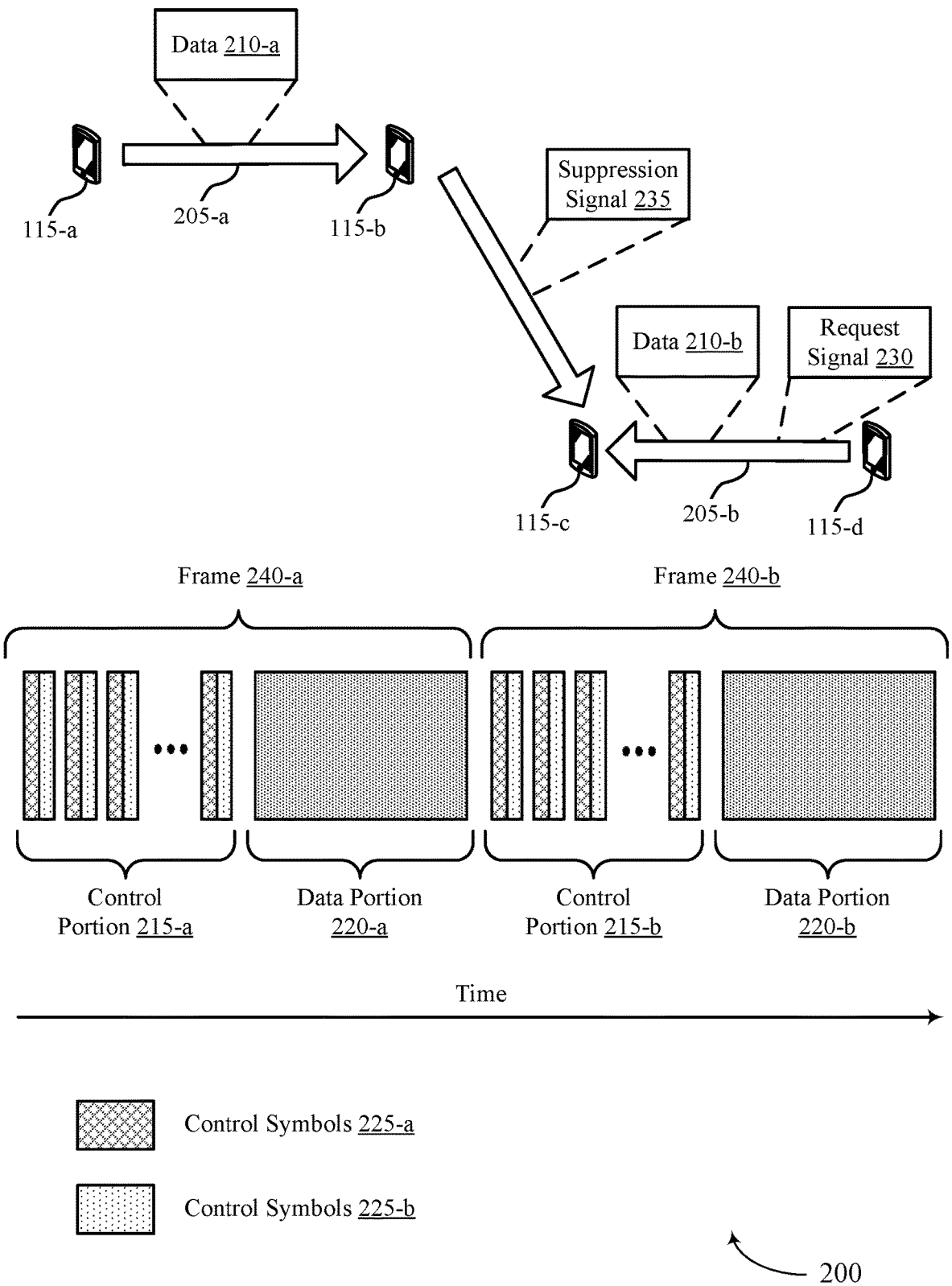
FIG. 2 illustrates an example of a wireless communications system that supports control overhead reduction in sidelink network in accordance with aspects of the present disclosure.

FIG. 2 illustrates an example of a wireless communications system 200 that supports control overhead reduction in sidelink network in accordance with aspects of the present disclosure. In some examples, wireless communications system 200 may implement aspects of wireless communications system 100. Wireless communications system 200 may include UEs 115-a, 115-b, 115-c, and 115-d, which may be examples of UEs 115 as described with respect to FIG. 1. UE 115-a and UE 115-b may be an example of a primary, high priority sidelink UE pair. UE 115-c and UE 115-d may be an example of a secondary, lower priority sidelink UE pair.

UEs 115 may communicate according to the resources in each frame 240. Each frame 240 may include control portions 215 and data portions 220. Frame 240-a may be followed by frame 240-b in time. A frame 240 may be an example of a regular or periodic communications structure (e.g., a frame structure or a communication structure) known to or identified by UEs 115. Frames 240 may also be configured at UEs 115 based on signaling from a base station 105. A frame 240 may include sets of communication resources such as subframes, slots, symbols, sets of symbols, etc. In some cases the frame may have a fixed number of symbol periods of a same duration, where the duration may vary slightly. For example, the duration of the symbol periods may be based on a cyclic prefix duration. Each frame 240 may have synchronized boundaries, such that frames 240-a and 240-b have the same length, and frame 240-b begins immediately after frame 240-a. For example, a frame 240 may have a set duration (e.g., 10 ms).

In some configurations, the sets of sidelink UE pairs may use control portions 215 to contend for access to data portion 220. For example, one UE 115 of the primary pair of UEs 115-a and 115-b may transmit a contention signal in a control symbol 225-a to request usage of data portion 220-a for data transmission by the higher priority pair. Control symbols 225-a may be examples of transmit request signal symbols. If the primary pair of UEs 115 does not transmit a signal to claim data portion 220-*a*, a UE 115 of secondary pair of UE 115-*c* and 115-*d* may transmit a signal to claim data portion 220-*a*. At the completion of this contention procedure in control portion 215-*a*, the pair of UEs 115 that claimed data portion 220-*a* may transmit data 210 over a sidelink channel 205 throughout the duration of data portion 220-*a*. For example, if the primary pair of UEs 115 claimed data portion 220-*a*, UE 115-*a* may transmit data 210-*a* to UE 115-*b* over sidelink channel 205-*a*. Alternatively, if the secondary pair of UEs 115 transmitted a contention signal and did not detect a contention signal from the higher priority pair, UE 115-*d* may transmit data 210-*b* to UE 115-*c* over sidelink channel 205-*b*. The sidelink pair transmitting data 210 may stop transmitting data 210 at the end of data portion 220-*a*, and the contention procedure may begin again in next control portion 215-*b*.

Some sidelink communications system may include a small number of active sidelink UE pairs (e.g., as shown in FIG. 2). In these cases, the size of the control portion 215 may be an inefficient use of resources, as a high amount of time and frequency resources are dedicated for contention assuming large number of active sidelink UE pairs. In cases with a small number of sidelink pair, a small amount of the dedicated control portion 215 may be used for transmission of contention signals, and much of the control portion 215 may remain unused. Thus, rather than halting data 210 transmission at the beginning of each control portion 215, a UE pair may continue transmitting data 210 throughout the next control portion 215. For example, UEs 115-*a* and 115-*b* may have previously won contention of data portion 220-*a* of the first frame 240-*a*. UE 115-*a* may transmit data 210-*a* to UE 115-*b* throughout data portion 220-*a*, and may continue transmitting data 210 throughout control portion 215-*b* of the second frame 240-*b*, rather than halting data 210-*a* transmission.

In these cases on ongoing data 210 transmission, the secondary UE pair may determine to request access to the data portion 220-*b*. A UE of the secondary pair may transmit a request signal 230, and UE 115-*d* may transmit request signal 230 to UE 115-*c* during control symbols 225 allocated for the secondary UE pair of control portion 215-*b*. Request signal 230 may include a signature, such as a pseudo-random signature, which may include identification information of the secondary pair of UEs 115. UE 115-*b* of the primary UE pair may receive the request signal 230 transmitted by UE 115-*d* to the intended receiver UE 115-*c* while UE 115-*b* is receiving data 210-*a*.

The primary UE pair may perform an interference measurement and analysis of the transmission from the secondary UE pair. For example, UEs 115-*a* and 115-*b* may determine whether data 210-*b* transmission by UE 115-*d* to UE 115-*c* may cause interference with data 210-*a* transmitted from UE 115-*a* to UE 115-*b*. UE 115-*a* and UE 115-*b* may determine whether the potential interference satisfies a threshold level of interference. In cases where the interference satisfies the threshold level of interference, a UE 115 of the primary pair may transmit a suppression signal 235 to the secondary, requesting UE pair. For example, UE 115-*b* may transmit suppression signal 235 to UE 115-*c*. Suppression signal 235 may be time synchronous to request signal 230, to allow processing at UE 115-*c*. Request signal 230 may be a defined sequence that allows for energy detection by UE 115-*b* and UE 115-*a*, and the length of the sequence of suppression signal 235 may depend on the received interference power. The defined sequence may in some cases be a Gold sequence. A Gold sequence may be an example of a binary random sequence, with a small amount of correlation between different Gold sequences. Thus, Gold sequences may be used for scrambling code or other wireless communication applications. In other cases, the sequence may be another type of maximum length sequence, or another type of sequence.

In these cases, UE 115-*b* may switch from a receive mode (to receive data 210-*a* from UE 115-*a*) to a transmit mode in order to transmit suppression signal 235 to the secondary UE pair. UE 115-*b* may then switch back to a receive mode to continue receiving data 210-*a* throughout the rest of control portion 215-*b* and data portion 220-*b*. While transmitting suppression signal 235, UE 115-*b* may briefly stop receiving data 210-*a* from UE 115-*a*. However, the time spent by UE 115-*b* to transmit suppression signal 235 may be much less that control portion 215-*b*, and therefore the sidelink pair of UE 115-*a* and 115-*b* may achieve a higher data throughput by efficiently using the majority of control portion 215-*b* to transmit data 210-*a*, rather than using none of control portion 215-*b* to transmit data.

In some cases, UE 115-*b* may transmit the suppression signal 235 to UE 115-*c*. In these cases, UE 115-*c* may refrain from transmitting a channel reservation response to UE 115-*d*. Thus, UE 115-*d* may be aware that UE 115-*c* and UE 115-*d* did not reserve data portion 220-*b*, and UE 115-*d* may not transmit data 210-*b* to UE 115-*c*. In some cases, UE 115-*b* may transmit suppression signal 235 to UE 115-*d*, and UE 115-*d* may determine to not transmit data 210-*b* to UE 115-*c*.

Thus, UE 115-*c* and UE 115-*d* may determine not to communicate data 210-*b* during data portion 220-*b*, and UE 115-*a* and 115-*b* may determine to continue transmitting data 210-*a* during data portion 220-*b*, as well as the next control portion 215 (not shown) after data portion 220-*b*.

In other cases, UE 115-*b* and UE 115-*a* may determine, based on the receive power of the request signal 230, that interference from data 210-*b* that may be transmitted by UE 115-*d* to UE 115-*c* may be less than a threshold level of interference. In these cases, UE 115-*b* may determine not to transmit suppression signal 235. Therefore, UE 115-*c* may not receive a suppression signal from UE 115-*b*, and the secondary UE pair may determine to communicate data 210-*b* during data portion 220-*b*. UE 115-*c* may transmit a channel reservation response to UE 115-*d* indicating that UEs 115-*c* and 115-*d* may communicate during data portion 220-*b*. Transmission of data 210-*a* by UE 115-*a* and transmission of data 210-*b* transmitted by UE 115-*d* may thus both occur during data portion 220-*b*, but the signals may not interfere with each other. This may be due to a difference in signal strength, coding, or the distance between the primary pair of UEs and the secondary pair of UEs (e.g., the distance between UE 115-*b* and UE 115-*c*).

Figure 3:
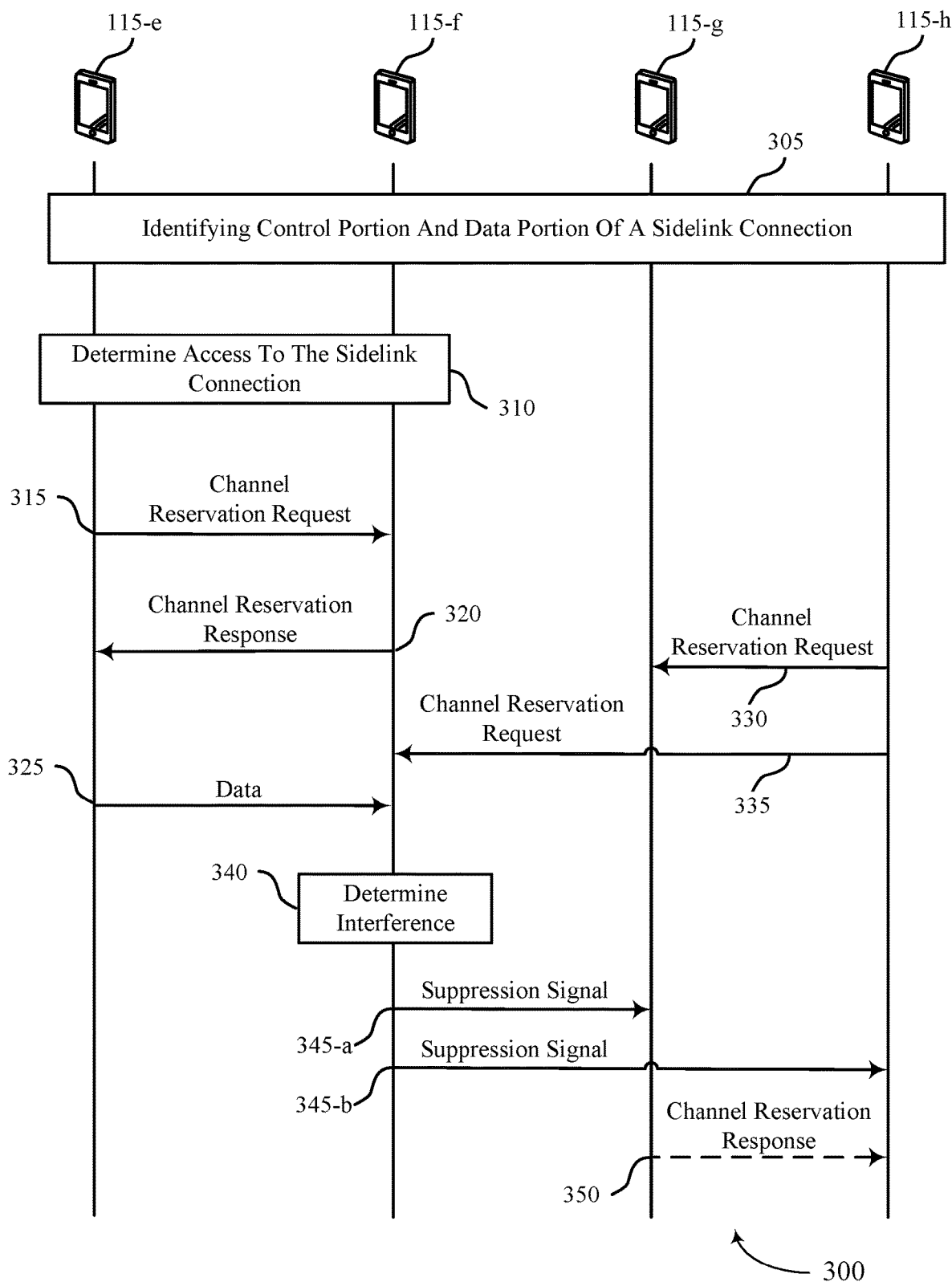
FIG. 3 illustrates an example of a process flow that supports control overhead reduction in sidelink network in accordance with aspects of the present disclosure.

FIG. 3 illustrates an example of a process flow 300 that supports control overhead reduction in sidelink network in accordance with aspects of the present disclosure. In some examples, process flow 300 may implement aspects of wireless communications systems 100 and 200. UEs 115-*e*, 115-*f*, 115-*g*, and 115-*h* may be examples of UEs 115 as described with response to FIGS. 1 and 2. UE 115-*e* and UE 115-*f* may be an example of a primary, higher priority sidelink UE pair, and UE 115-*g* and 115-*h* may be an example of a secondary, lower priority sidelink UE pair. UEs 115-*e*, 115-*f*, 115-*g*, and 115-*h* may lack an access link to a base station 105. UEs 115-*e*, 115-*f*, 115-*g*, and 115-*h* may operate according to a sidelink connection that may be an example of a PC5 V2V interface of a cellular network.

At 305, UEs 115-*e*, 115-*f*, 115-*g*, and 115-*h* may identify a frame including a control portion and a data portion. The data portion may be associated with the control portion, and the control portion may include a set of control regions. Each set of control regions may include a first TTI for channel reservation requests for a group of UEs 115 (e.g., UEs 115-e, 115-f, 115-g, and 115-h) and a second TTI for channel reservation responses for the group of UEs 115. Each control region of the set of control regions may correspond to a priority level of a set of priority levels. For example, earlier subsections of a control region in time may be allocated for UEs 115 that are transmitting higher priority data to transmit contention or reservation request messages. Later subsections of the control region may be allocated for UEs 115 that may be transmitting lower priority data to transmit contention or reservation request messages. The priority level may be based on the type of data to be transmitted, the type of device transmitting the data, or another parameter.

At 310, UE 115-f may determine that UE 115-e has obtained access to the sidelink connection for communications with UE 115-f in a first instance of the frame. Each of UEs 115-e and 115-f may obtain access to the sidelink connection. UE 115-f may obtain access to the sidelink connection based on a successful channel access procedure in a first instance of the frame. UE 115-f may make this determination based on receiving a channel reservation request from UE 115-e at 315. At 320, UE 115-f may transmit a channel reservation response message for UE 115-e. The sidelink connection may be in an unlicensed radio frequency spectrum band, or in a licensed radio frequency spectrum band.

At 325, UE 115-f may receive, from UE 115-e, a data signal in the data portion of the first instance of the frame and in at least a part of the control portion of a second instance of the frame that follows the first instance. UE 115-e may transmit the data signal based on receiving the channel reservation response at 320.

At 330, UE 115-g may receive, in the first TTI of the frame, a channel reservation request from UE 115-h. UE 115-g may receive the channel reservation request based on monitoring the first TTI of the frame, based on identifying the frame.

At 335, UE 115-f may receive a channel reservation request from UE 115-h. UE 115-f may receive the channel reservation request based on UE 115-h transmitting the channel reservation request at 330 to UE 115-g. The channel reservation request may be transmitted from UE 115-h to UE 115-g at 330, and detected at 335 at UE 115-f. The presence of the interference may be determined based on the received channel reservation request. The channel reservation request and the data signal at 325 may be received at least in part during a same time interval. In some cases, UE 115-f may switch from a receive mode to a transmit mode based on determining the presence of the interference. The signal indicating that UE 115-f is receiving data from UE 115-e (e.g., the suppression signal) may be transmitted by UE 115-f while UE 115-f is in the transmit mode.

UE 115-f may identify a length of the suppression signal that UE 115-f is receiving data from UE 115-e based on the interference. UE 115-f may determine a receive power for the interference, and the length of the signal may be determined based on the determined receive power for the interference.

At 340, UE 115-f may determine, in the at least a part of the control portion of the second instance of the frame, a presence of interference on the sidelink connection.

At 345-a, UE 115-f may transmit, to UE 115-g, and based on determining the presence of the interference a signal indicating that UE 115-f is receiving data from UE 115-e. This signal may be an example of a suppression signal. In some cases, UE 115-f may determine that a level of the interference satisfies an interference threshold, where the signal indicating that UE 115-f is receiving data from UE 115-e is based on the level of interference satisfying the interference threshold. The suppression signal may include a predetermined sequence. UE 115-g may thus determine to refrain from transmitting a channel reservation response to UE 115-h at 350 based on receiving the suppression signal at 345. Further, at 345-b, UE 115-f may transmit a suppression signal to UE 115-h. Based on receiving this suppression signal, UE 115-h may determine not to transmit data to UE 115-g during a next data portion, regardless of whether UE 115-h receives the channel reservation response signal from UE 115-g at 350.

Figure 4:
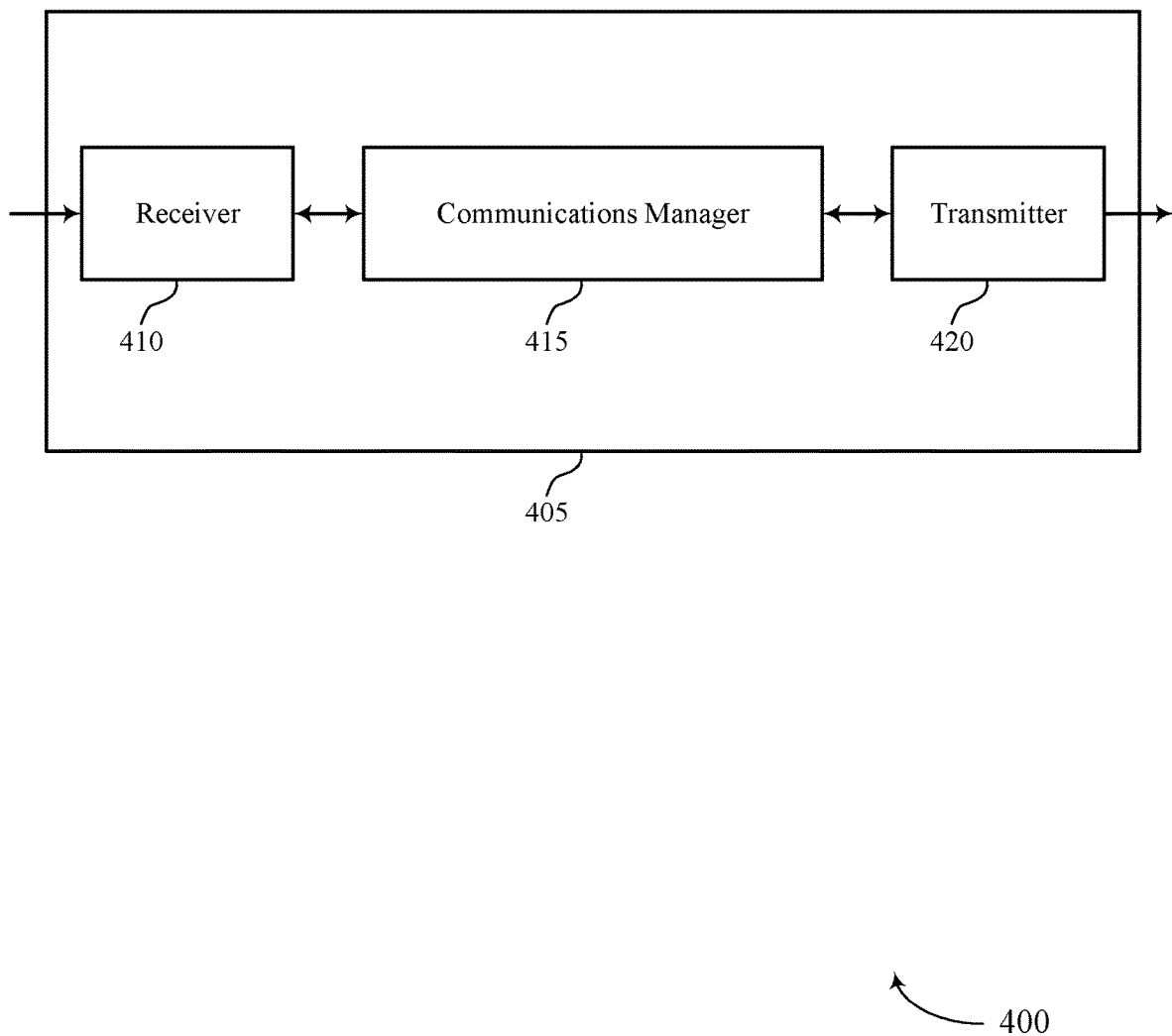
FIGS. 4 and 5 show block diagrams of devices that support control overhead reduction in sidelink network in accordance with aspects of the present disclosure.

FIG. 4 shows a block diagram 400 of a device 405 that supports control overhead reduction in sidelink network in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to control overhead reduction in sidelink network, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, determine that a second UE has obtained access to the sidelink connection for communications with the first UE in a first instance of the frame, and receive, from the second UE, a data signal in the data portion of the first instance of the frame and in at least a part of the control portion of a second instance of the frame that follows the first instance. The communications manager 415 may also identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, obtain access to the sidelink connection based on a successful channel access procedure in a first instance of the frame, and transmit, to a first UE, a data signal in the data portion of the first instance of the frame and in at least a part of the control portion of a second instance of the frame that follows the first instance. The communications manager 415 may also identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, receive, in the first TTI of the frame, a channel reservation request from a fourth UE, receive, from a first UE, a signal indicating that the first UE is receiving data from a second UE during at least a part of the control portion of the frame, and determine to refrain from transmitting a channel reservation response to the fourth UE in response to the received channel reservation request based on receiving the signal indicating that the first UE is receiving data from a second UE. The communications manager 415 may also identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, transmit, in the first TTI of the frame, a channel reservation request to a third UE, receive, from a first UE, a signal indicating that the first UE is receiving data from a second UE during at least a part of the control portion of the frame, and determine to refrain from transmitting a data signal to the third UE in response to the received signal indicating the first UE is receiving data from a second UE. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

The actions performed by communications manager 415 as described herein may be implemented to realize one or more potential advantages. One implementation may allow a set of UEs 115 to efficiently communicate higher priority communications. This may allow a UE 115 to save power and increase battery life by avoiding retransmitting communications based on occurrences of interference. Further, the actions performed by communications manager 415 may be implemented to improve resource usage, by decreasing the amount of unused resources by efficiently reallocating or reusing available resources for different communications.

Figure 5:
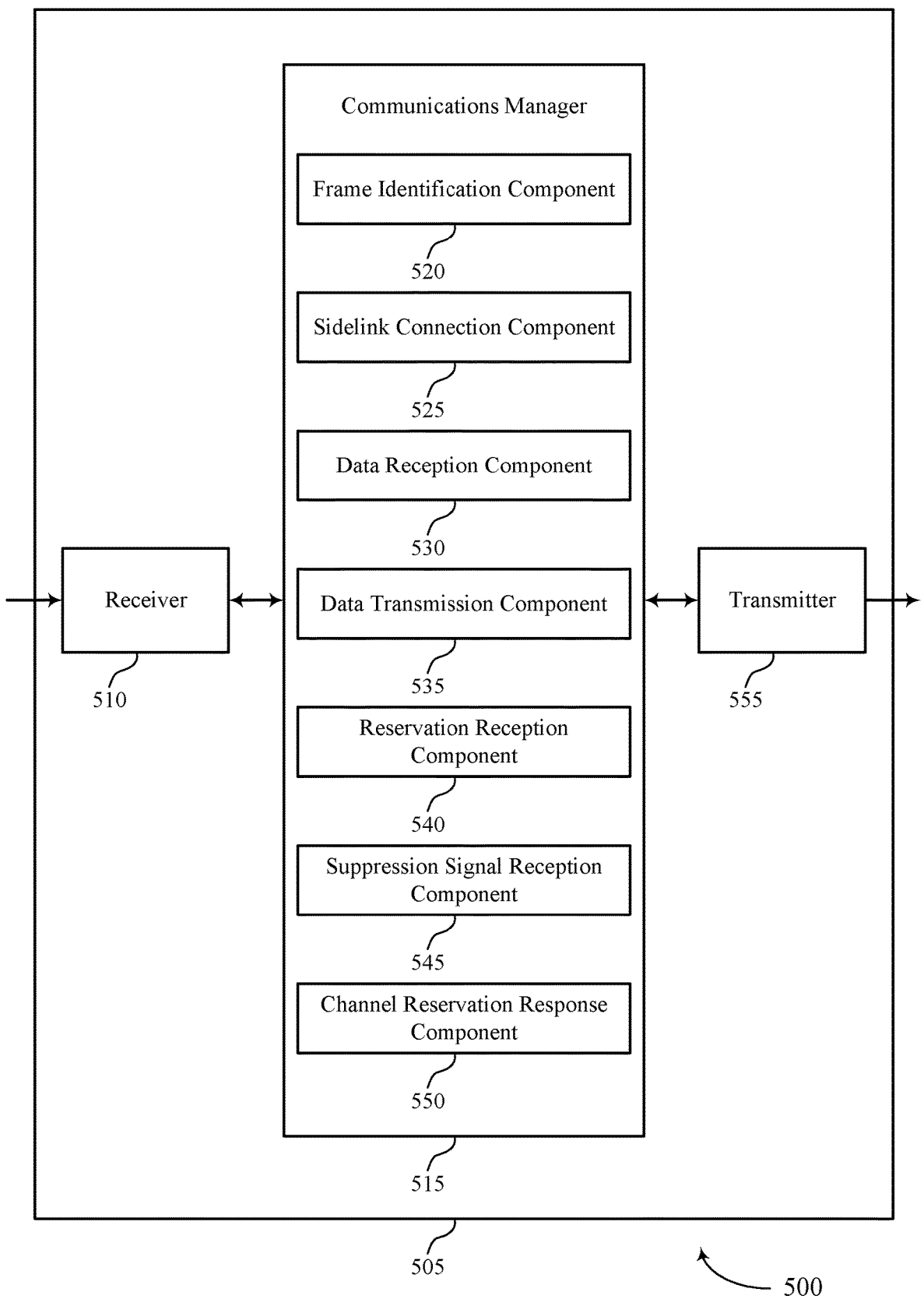

FIG. 5 shows a block diagram 500 of a device 505 that supports control overhead reduction in sidelink network in accordance with aspects of the present disclosure. The device 505 may be an example of aspects of a device 405, or a UE 115 as described herein. The device 505 may include a receiver 510, a communications manager 515, and a transmitter 555. The device 505 may also include a processor. Each of these components may be in communication with one another (e.g., via one or more buses).

The receiver 510 may receive information such as packets, user data, or control information associated with various information channels (e.g., control channels, data channels, and information related to control overhead reduction in sidelink network, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a frame identification component 520, a sidelink connection component 525, a data reception component 530, a data transmission component 535, a reservation reception component 540, a suppression signal reception component 545, and a channel reservation response component 550. The communications manager 515 may be an example of aspects of the communications manager 710 described herein.

The frame identification component 520 may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs.

The sidelink connection component 525 may determine that a second UE has obtained access to the sidelink connection for communications with the first UE in a first instance of the frame.

The data reception component 530 may receive, from the second UE, a data signal in the data portion of the first instance of the frame and in at least a part of the control portion of a second instance of the frame that follows the first instance.

The frame identification component 520 may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs.

The sidelink connection component 525 may obtain access to the sidelink connection based on a successful channel access procedure in a first instance of the frame. The data transmission component 535 may transmit, to a first UE, a data signal in the data portion of the first instance of the frame and in at least a part of the control portion of a second instance of the frame that follows the first instance.

The frame identification component 520 may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs.

The reservation reception component 540 may receive, in the first TTI of the frame, a channel reservation request from a fourth UE. The suppression signal reception component 545 may receive, from a first UE, a signal indicating that the first UE is receiving data from a second UE during at least a part of the control portion of the frame.

The channel reservation response component 550 may determine to refrain from transmitting a channel reservation response to the fourth UE in response to the received channel reservation request based on receiving the signal indicating that the first UE is receiving data from a second UE.

The frame identification component 520 may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs.

The sidelink connection component 525 may transmit, in the first TTI of the frame, a channel reservation request to a third UE. The suppression signal reception component 545 may receive, from a first UE, a signal indicating that the first UE is receiving data from a second UE during at least a part of the control portion of the frame.

The data transmission component 535 may determine to refrain from transmitting a data signal to the third UE in response to the received signal indicating the first UE is receiving data from a second UE.

The transmitter 555 may transmit signals generated by other components of the device 505. In some examples, the transmitter 555 may be collocated with a receiver 510 in a transceiver module. For example, the transmitter 555 may be an example of aspects of the transceiver 720 described with reference to FIG. 7. The transmitter 555 may utilize a single antenna or a set of antennas.

A processor of a UE 115 (e.g., controlling the receiver 510, the transmitter 555, or the transceiver 720 as described with reference to FIG. 7) may efficiently operate the components described herein to realize one or more potential advantages. For example, the processor of the UE 115 may identify a frame including a portion for and a portion for data. The processor of the UE 115 may efficiently determine whether to communicate data during the control portion based on operating receiver 510 to receive a request signal from another UE 115. This may allow a processor of a UE 115 to efficiently utilize available resources for high priority data communication. Further, a processor of a UE 115 may also operate a transmitter 555 to transmit a request signal, and operate a receiver 510 to receive a suppression signal. The processor of the UE 115 may therefore determine not to transmit data during a next data portion. This determination may avoid communications collisions with data communications by higher priority UEs 115. This may thereby save power and increase battery life of a UE 115 by avoiding extensive retransmissions and incorrectly transmitted communications.

Figure 6:
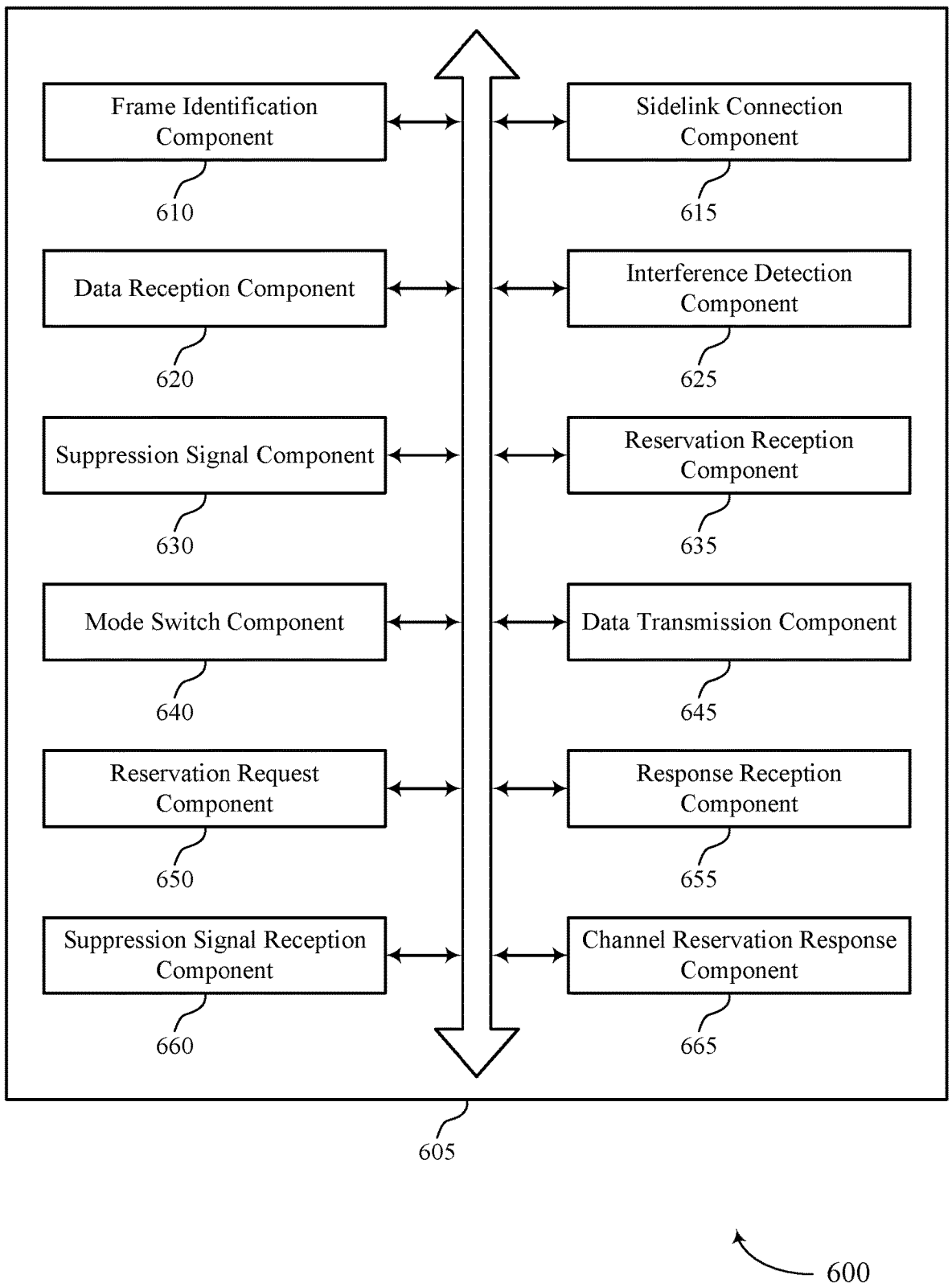
FIG. 6 shows a block diagram of a communications manager that supports control overhead reduction in sidelink network in accordance with aspects of the present disclosure.

FIG. 6 shows a block diagram 600 of a communications manager 605 that supports control overhead reduction in sidelink network in accordance with aspects of the present disclosure. The communications manager 605 may be an example of aspects of a communications manager 415, a communications manager 515, or a communications manager 710 described herein. The communications manager 605 may include a frame identification component 610, a sidelink connection component 615, a data reception component 620, an interference detection component 625, a suppression signal component 630, a reservation reception component 635, a mode switch component 640, a data transmission component 645, a reservation request component 650, a response reception component 655, a suppression signal reception component 660, and a channel reservation response component 665. Each of these modules may communicate, directly or indirectly, with one another (e.g., via one or more buses).

The frame identification component 610 may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs.

In some examples, the frame identification component 610 may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs.

In some examples, the frame identification component 610 may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs.

In some examples, the frame identification component 610 may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs.

In some cases, each control region of the set of control regions corresponds to a priority level of a set of priority levels. In some cases, the first UE lacks an access link to a base station.

The sidelink connection component 615 may determine that a second UE has obtained access to the sidelink connection for communications with the first UE in a first instance of the frame. In some examples, the sidelink connection component 615 may obtain access to the sidelink connection based on a successful channel access procedure in a first instance of the frame. In some examples, the sidelink connection component 615 may transmit, in the first TTI of the frame, a channel reservation request to a third UE.

In some cases, the sidelink connection is in an unlicensed radio frequency spectrum band. In some cases, the sidelink connection is in a shared licensed radio frequency spectrum band. In some cases, the first UE lacks an access link to a base station. In some cases, the sidelink connection includes a PC5 vehicle-to-vehicle interface of a cellular network.

The data reception component 620 may receive, from the second UE, a data signal in the data portion of the first instance of the frame and in at least a part of the control portion of a second instance of the frame that follows the first instance.

The reservation reception component 635 may receive, in the first TTI of the frame, a channel reservation request from a fourth UE. In some examples, the reservation reception component 635 may receive, at the first UE, a channel reservation request addressed to a third UE and from a fourth UE, where the presence of the interference is determined based on the received channel reservation request. In some examples, the reservation reception component 635 may identify a length of the signal indicating that the first UE is receiving data from the second UE based on the interference. In some examples, the reservation reception component 635 may receive, from the second UE, a channel reservation request addressing the first UE. In some cases, the channel reservation request and the data signal are received at least in part during a same time interval.

The data transmission component 645 may transmit, to a first UE, a data signal in the data portion of the first instance of the frame and in at least a part of the control portion of a second instance of the frame that follows the first instance. In some examples, the data transmission component 645 may determine to refrain from transmitting a data signal to the third UE in response to the received signal indicating the first UE is receiving data from a second UE. In some examples, the data transmission component 645 may determine to refrain from transmitting the data signal to the third UE in a second frame.

The suppression signal reception component 660 may receive, from a first UE, a signal indicating that the first UE is receiving data from a second UE during at least a part of the control portion of the frame. In some examples, the suppression signal reception component 660 may receive, from a first UE, a signal indicating that the first UE is receiving data from a second UE during at least a part of the control portion of the frame. In some cases, the received signal indicating that the first UE is receiving data from the second UE includes a predetermined sequence.

The channel reservation response component 665 may determine to refrain from transmitting a channel reservation response to the fourth UE in response to the received channel reservation request based on receiving the signal indicating that the first UE is receiving data from a second UE.

The interference detection component 625 may determine, in the at least a part of the control portion of the second instance of the frame, a presence of interference on the sidelink connection. In some examples, the interference detection component 625 may determine a receive power for the interference, the length of the signal determined based on the determined receive power for the interference.

The suppression signal component 630 may transmit, based on determining the presence of the interference, a signal indicating that the first UE is receiving data from the second UE. In some examples, the suppression signal component 630 may determine that a level of the interference satisfies an interference threshold, where the signal indicating that the first UE is receiving data from the second UE is transmitted based on the level of the interference satisfying the interference threshold. In some examples, the suppression signal component 630 may transmit, in response to the received channel reservation request, a channel reservation response addressing the second UE. In some cases, the signal indicating that the first UE is receiving data from the second UE includes a predetermined sequence.

The mode switch component 640 may switch from a receive mode to a transmit mode based on determining the presence of the interference, the signal indicating that the first UE is receiving data from the second UE transmitted in the transmit mode.

The reservation request component 650 may transmit, based on the obtaining access to the sidelink connection, a channel reservation request addressing the first UE. In some examples, the reservation request component 650 may monitor for channel reservation requests during the first TTI based on the identified frame. The response reception component 655 may receive, in response to the transmitted channel reservation request, a channel reservation response from the first UE, the data signal transmitted based on receiving the channel reservation response.

Figure 7:
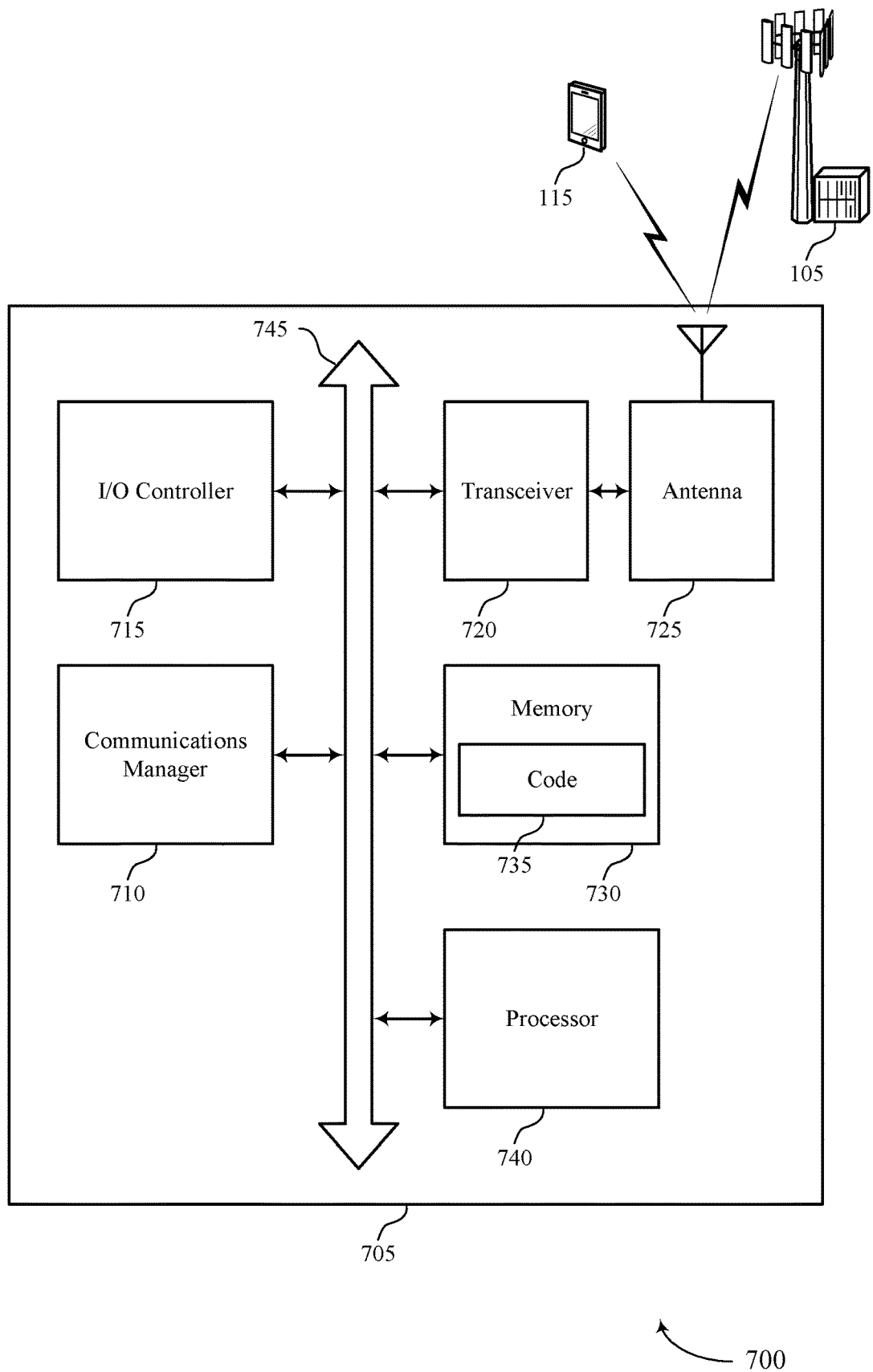
FIG. 7 shows a diagram of a system including a device that supports control overhead reduction in sidelink network in accordance with aspects of the present disclosure.

FIG. 7 shows a diagram of a system 700 including a device 705 that supports control overhead reduction in sidelink network in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, determine that a second UE has obtained access to the sidelink connection for communications with the first UE in a first instance of the frame, and receive, from the second UE, a data signal in the data portion of the first instance of the frame and in at least a part of the control portion of a second instance of the frame that follows the first instance.

The communications manager 710 may also identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, obtain access to the sidelink connection based on a successful channel access procedure in a first instance of the frame, and transmit, to a first UE, a data signal in the data portion of the first instance of the frame and in at least a part of the control portion of a second instance of the frame that follows the first instance.

The communications manager 710 may also identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, receive, in the first TTI of the frame, a channel reservation request from a fourth UE, receive, from a first UE, a signal indicating that the first UE is receiving data from a second UE during at least a part of the control portion of the frame, and determine to refrain from transmitting a channel reservation response to the fourth UE in response to the received channel reservation request based on receiving the signal indicating that the first UE is receiving data from a second UE.

The communications manager 710 may also identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs, transmit, in the first TTI of the frame, a channel reservation request to a third UE, receive, from a first UE, a signal indicating that the first UE is receiving data from a second UE during at least a part of the control portion of the frame, and determine to refrain from transmitting a data signal to the third UE in response to the received signal indicating the first UE is receiving data from a second UE.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting control overhead reduction in sidelink network).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
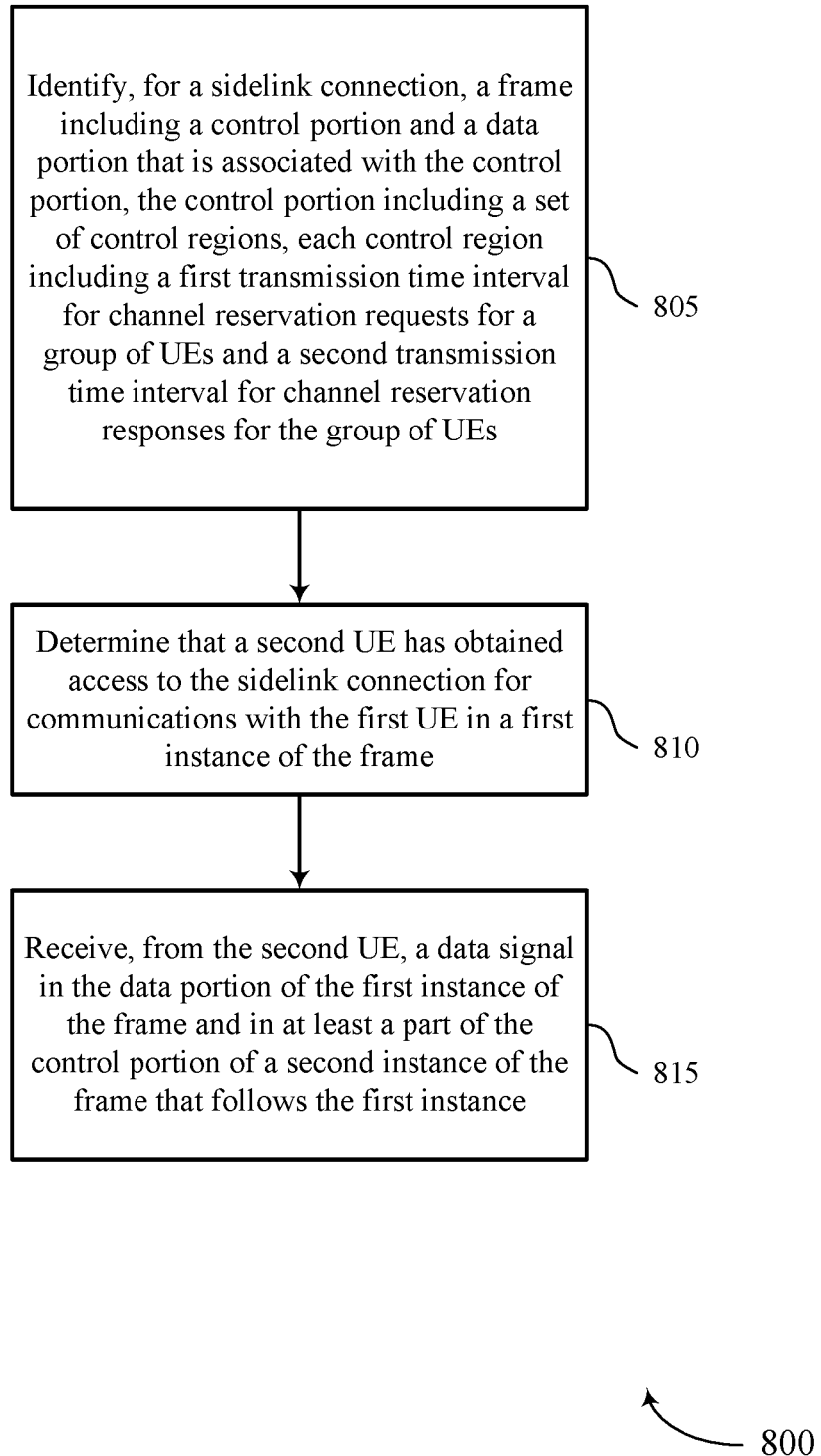
FIGS. 8 through 12 show flowcharts illustrating methods that support control overhead reduction in sidelink network in accordance with aspects of the present disclosure.

FIG. 8 shows a flowchart illustrating a method 800 that supports control overhead reduction in sidelink network in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs. The operations of 805 may be performed according to the methods described herein. In some examples, aspects of the operations of 805 may be performed by a frame identification component as described with reference to FIGS. 4 through 7.

At 810, the UE may determine that a second UE has obtained access to the sidelink connection for communications with the first UE in a first instance of the frame. The operations of 810 may be performed according to the methods described herein. In some examples, aspects of the operations of 810 may be performed by a sidelink connection component as described with reference to FIGS. 4 through 7.

At 815, the UE may receive, from the second UE, a data signal in the data portion of the first instance of the frame and in at least a part of the control portion of a second instance of the frame that follows the first instance. The operations of 815 may be performed according to the methods described herein. In some examples, aspects of the operations of 815 may be performed by a data reception component as described with reference to FIGS. 4 through 7.

Figure 9:
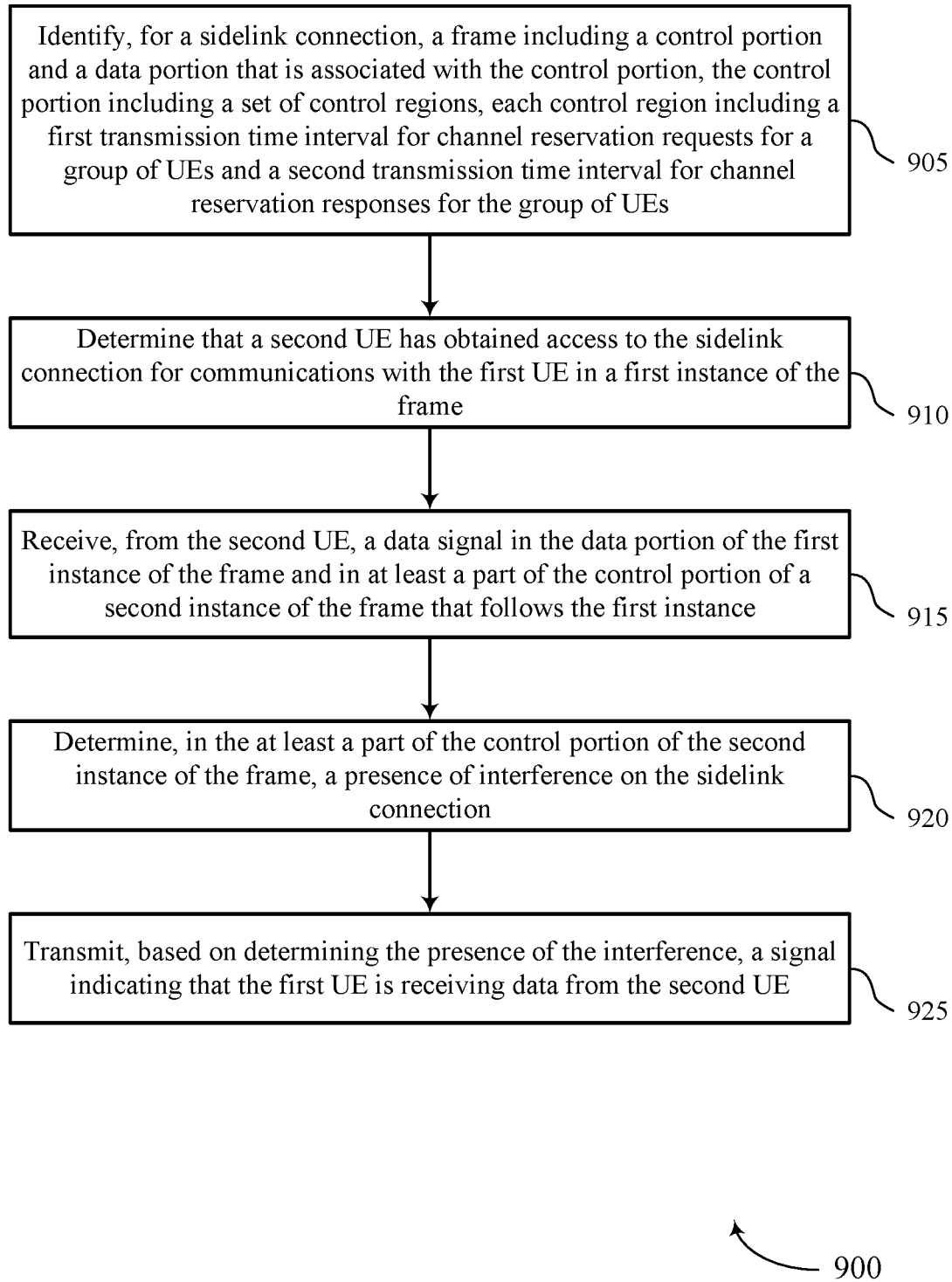

FIG. 9 shows a flowchart illustrating a method 900 that supports control overhead reduction in sidelink network in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs. The operations of 905 may be performed according to the methods described herein. In some examples, aspects of the operations of 905 may be performed by a frame identification component as described with reference to FIGS. 4 through 7.

At 910, the UE may determine that a second UE has obtained access to the sidelink connection for communications with the first UE in a first instance of the frame. The operations of 910 may be performed according to the methods described herein. In some examples, aspects of the operations of 910 may be performed by a sidelink connection component as described with reference to FIGS. 4 through 7.

At 915, the UE may receive, from the second UE, a data signal in the data portion of the first instance of the frame and in at least a part of the control portion of a second instance of the frame that follows the first instance. The operations of 915 may be performed according to the methods described herein. In some examples, aspects of the operations of 915 may be performed by a data reception component as described with reference to FIGS. 4 through 7.

At 920, the UE may determine, in the at least a part of the control portion of the second instance of the frame, a presence of interference on the sidelink connection. The operations of 920 may be performed according to the methods described herein. In some examples, aspects of the operations of 920 may be performed by an interference detection component as described with reference to FIGS. 4 through 7.

At 925, the UE may transmit, based on determining the presence of the interference, a signal indicating that the first UE is receiving data from the second UE. The operations of 925 may be performed according to the methods described herein. In some examples, aspects of the operations of 925 may be performed by a suppression signal component as described with reference to FIGS. 4 through 7.

Figure 10:
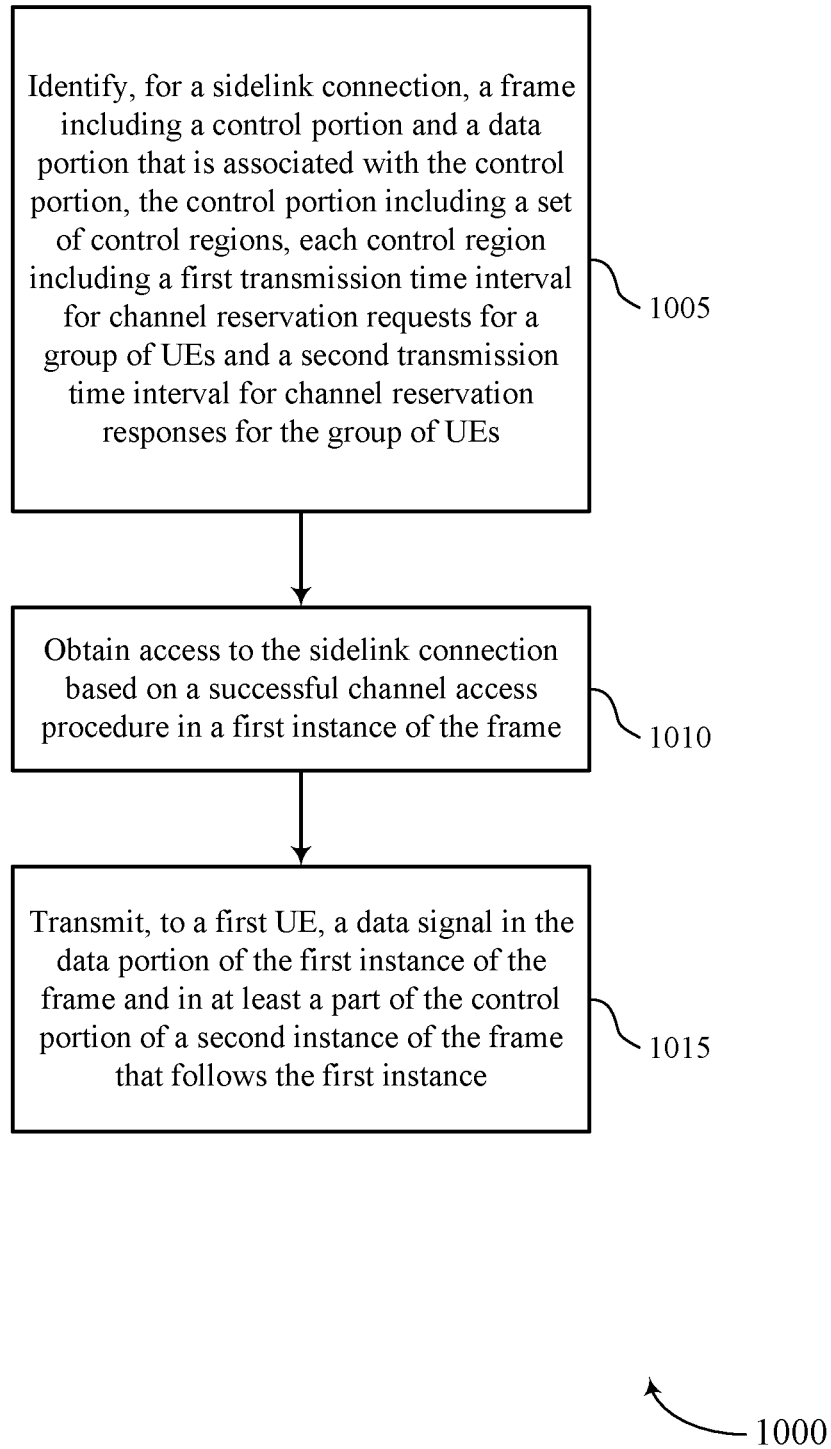

FIG. 10 shows a flowchart illustrating a method 1000 that supports control overhead reduction in sidelink network in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs. The operations of 1005 may be performed according to the methods described herein. In some examples, aspects of the operations of 1005 may be performed by a frame identification component as described with reference to FIGS. 4 through 7.

At 1010, the UE may obtain access to the sidelink connection based on a successful channel access procedure in a first instance of the frame. The operations of 1010 may be performed according to the methods described herein. In some examples, aspects of the operations of 1010 may be performed by a sidelink connection component as described with reference to FIGS. 4 through 7.

At 1015, the UE may transmit, to a first UE, a data signal in the data portion of the first instance of the frame and in at least a part of the control portion of a second instance of the frame that follows the first instance. The operations of 1015 may be performed according to the methods described herein. In some examples, aspects of the operations of 1015 may be performed by a data transmission component as described with reference to FIGS. 4 through 7.

Figure 11:
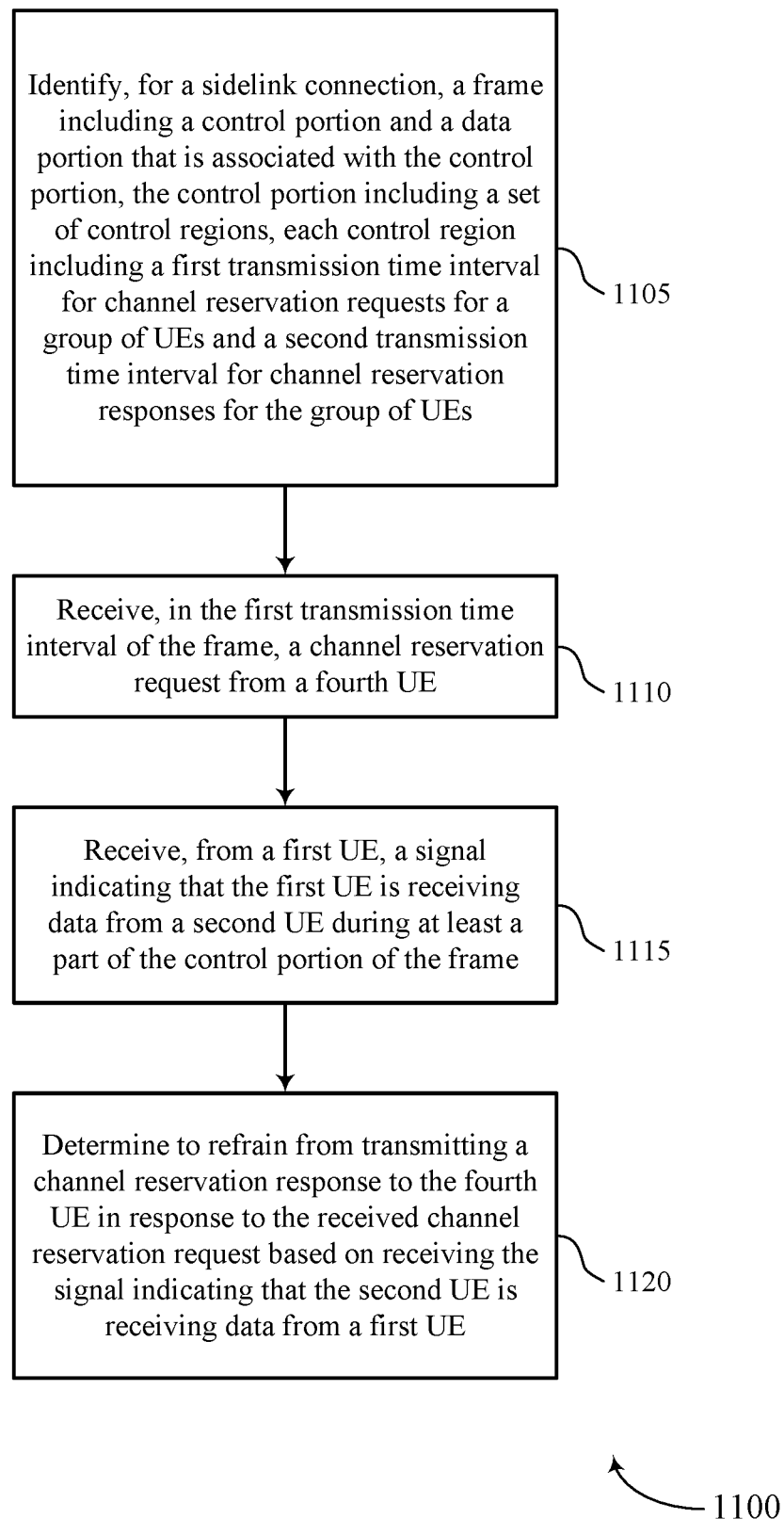

FIG. 11 shows a flowchart illustrating a method 1100 that supports control overhead reduction in sidelink network in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs. The operations of 1105 may be performed according to the methods described herein. In some examples, aspects of the operations of 1105 may be performed by a frame identification component as described with reference to FIGS. 4 through 7.

At 1110, the UE may receive, in the first TTI of the frame, a channel reservation request from a fourth UE. The operations of 1110 may be performed according to the methods described herein. In some examples, aspects of the operations of 1110 may be performed by a reservation reception component as described with reference to FIGS. 4 through 7.

At 1115, the UE may receive, from a first UE, a signal indicating that the first UE is receiving data from a second UE during at least a part of the control portion of the frame. The operations of 1115 may be performed according to the methods described herein. In some examples, aspects of the operations of 1115 may be performed by a suppression signal reception component as described with reference to FIGS. 4 through 7.

At 1120, the UE may determine to refrain from transmitting a channel reservation response to the fourth UE in response to the received channel reservation request based on receiving the signal indicating that the first UE is receiving data from a second UE. The operations of 1120 may be performed according to the methods described herein. In some examples, aspects of the operations of 1120 may be performed by a channel reservation response component as described with reference to FIGS. 4 through 7.

Figure 12:
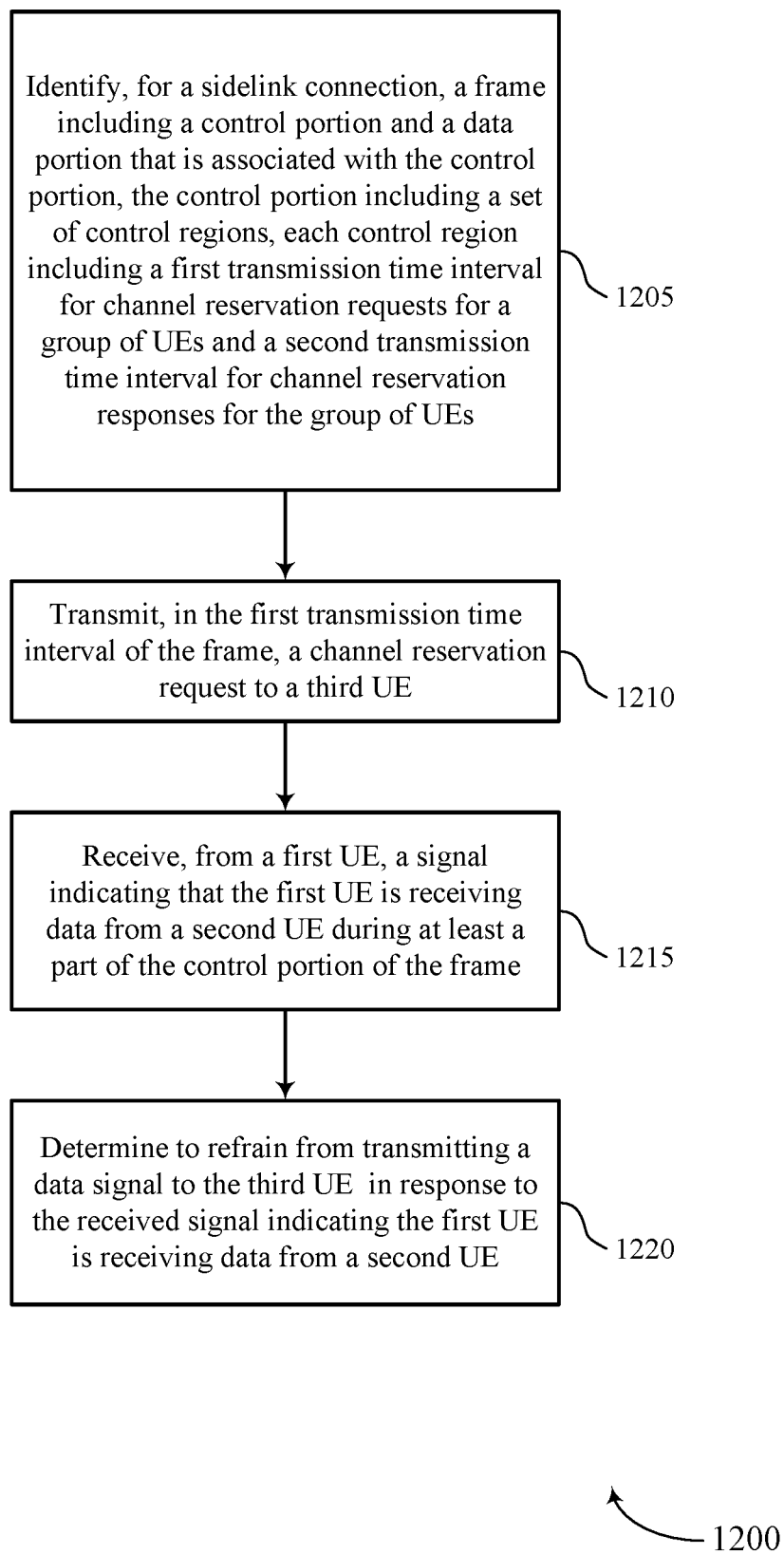

FIG. 12 shows a flowchart illustrating a method 1200 that supports control overhead reduction in sidelink network in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may identify, for a sidelink connection, a frame including a control portion and a data portion that is associated with the control portion, the control portion including a set of control regions, each control region including a first TTI for channel reservation requests for a group of UEs and a second TTI for channel reservation responses for the group of UEs. The operations of 1205 may be performed according to the methods described herein. In some examples, aspects of the operations of 1205 may be performed by a frame identification component as described with reference to FIGS. 4 through 7.

At 1210, the UE may transmit, in the first TTI of the frame, a channel reservation request to a third UE. The operations of 1210 may be performed according to the methods described herein. In some examples, aspects of the operations of 1210 may be performed by a sidelink connection component as described with reference to FIGS. 4 through 7.

At 1215, the UE may receive, from a first UE, a signal indicating that the first UE is receiving data from a second UE during at least a part of the control portion of the frame. The operations of 1215 may be performed according to the methods described herein. In some examples, aspects of the operations of 1215 may be performed by a suppression signal reception component as described with reference to FIGS. 4 through 7.

At 1220, the UE may determine to refrain from transmitting a data signal to the third UE in response to the received signal indicating the first UE is receiving data from a second UE. The operations of 1220 may be performed according to the methods described herein. In some examples, aspects of the operations of 1220 may be performed by a data transmission component as described with reference to FIGS. 4 through 7.

The following provides an overview of aspects of the present disclosure:

Aspect 1: A method for wireless communications at a first UE, comprising: identifying, for a sidelink connection, a frame comprising a control portion and a data portion that is associated with the control portion, the control portion comprising a plurality of control regions, each control region comprising a first transmission time interval for channel reservation requests for a group of UEs and a second transmission time interval for channel reservation responses for the group of UEs; determining that a second UE has obtained access to the sidelink connection for communications with the first UE in a first instance of the frame; and receiving, from the second UE, a data signal in the data portion of the first instance of the frame and in at least a part of the control portion of a second instance of the frame that follows the first instance.

Aspect 2: The method of aspect 1, further comprising: determining, in the at least a part of the control portion of the second instance of the frame, a presence of interference on the sidelink connection; and transmitting, based at least in part on determining the presence of the interference, a signal indicating that the first UE is receiving data from the second UE.

Aspect 3: The method of aspect 2, further comprising: determining that a level of the interference satisfies an interference threshold, wherein the signal indicating that the first UE is receiving data from the second UE is transmitted based at least in part on the level of the interference satisfying the interference threshold.

Aspect 4: The method of any of aspects 2 through 3, further comprising: receiving, at the first UE, a channel reservation request addressed to a third UE and from a fourth UE, wherein the presence of the interference is determined based at least in part on the received channel reservation request.

Aspect 5: The method of aspect 4, wherein the channel reservation request and the data signal are received at least in part during a same time interval.

Aspect 6: The method of any of aspects 2 through 5, further comprising: switching from a receive mode to a transmit mode based at least in part on determining the presence of the interference, the signal indicating that the first UE is receiving data from the second UE transmitted in the transmit mode.

Aspect 7: The method of any of aspects 2 through 6, further comprising: identifying a length of the signal indicating that the first UE is receiving data from the second UE based at least in part on the interference.

Aspect 8: The method of aspect 7, further comprising: determining a receive power for the interference, the length of the signal determined based at least in part on the determined receive power for the interference.

Aspect 9: The method of any of aspects 2 through 8, wherein the signal indicating that the first UE is receiving data from the second UE comprises a predetermined sequence.

Aspect 10: The method of any of aspects 1 through 9, wherein determining that the second UE has obtained access to the sidelink connection for communications with the first UE comprises: receiving, from the second UE, a channel reservation request addressing the first UE.

Aspect 11: The method of aspect 10, further comprising: transmitting, in response to the received channel reservation request, a channel reservation response addressing the second UE.

Aspect 12: The method of any of aspects 1 through 11, wherein each control region of the plurality of control regions corresponds to a priority level of a set of priority levels.

Aspect 13: The method of any of aspects 1 through 12, wherein the sidelink connection is in an unlicensed radio frequency spectrum band.

Aspect 14: The method of any of aspects 1 lthrough 13, wherein the sidelink connection is in a shared licensed radio frequency spectrum band.

Aspect 15: The method of any of aspects 1 through 14, wherein the first UE lacks an access link to a base station.

Aspect 16: The method of any of aspects 1 through 15, wherein the sidelink connection comprises a PC5 vehicle-to-vehicle interface of a cellular network.

Aspect 17: A method for wireless communications at a second UE, comprising: identifying, for a sidelink connection, a frame comprising a control portion and a data portion that is associated with the control portion, the control portion comprising a plurality of control regions, each control region comprising a first transmission time interval for channel reservation requests for a group of UEs and a second transmission time interval for channel reservation responses for the group of UEs; obtaining access to the sidelink connection based at least in part on a successful channel access procedure in a first instance of the frame; and transmitting, to a first UE, a data signal in the data portion of the first instance of the frame and in at least a part of the control portion of a second instance of the frame that follows the first instance.

Aspect 18: The method of aspect 17, further comprising: transmitting, based at least in part on the obtaining access to the sidelink connection, a channel reservation request addressing the first UE; and receiving, in response to the transmitted channel reservation request, a channel reservation response from the first UE, the data signal transmitted based at least in part on receiving the channel reservation response.

Aspect 19: The method of any of aspects 17 through 18, wherein each control region of the plurality of control regions corresponds to a priority level of a set of priority levels.

Aspect 20: The method of any of aspects 17 through 19, wherein the sidelink connection is in an unlicensed radio frequency spectrum band or a shared licensed radio frequency spectrum band.

Aspect 21: A method for wireless communications at a third UE, comprising: identifying, for a sidelink connection, a frame comprising a control portion and a data portion that is associated with the control portion, the control portion comprising a plurality of control regions, each control region comprising a first transmission time interval for channel reservation requests for a group of UEs and a second transmission time interval for channel reservation responses for the group of UEs; receiving, in the first transmission time interval of the frame, a channel reservation request from a fourth UE; receiving, from a first UE, a signal indicating that the first UE is receiving data from a second UE during at least a part of the control portion of the frame; and determining to refrain from transmitting a channel reservation response to the fourth UE in response to the received channel reservation request based at least in part on receiving the signal indicating that the first UE is receiving data from a second UE.

Aspect 22: The method of aspect 21, further comprising: monitoring for channel reservation requests during the first transmission time interval based at least in part on the identified frame.

Aspect 23: The method of any of aspects 21 through 22, wherein the received signal indicating that the first UE is receiving data from the second UE comprises a predetermined sequence.

Aspect 24: The method of any of aspects 21 through 23, wherein each control region of the plurality of control regions corresponds to a priority level of a set of priority levels.

Aspect 25: The method of any of aspects 21 through 24, wherein the sidelink connection is in an unlicensed radio frequency spectrum band or a shared licensed radio frequency spectrum band.

Aspect 26: A method for wireless communications at a fourth user equipment, comprising: identifying, for a sidelink connection, a frame comprising a control portion and a data portion that is associated with the control portion, the control portion comprising a plurality of control regions, each control region comprising a first transmission time interval for channel reservation requests for a group of UEs and a second transmission time interval for channel reservation responses for the group of UEs; transmitting, in the first transmission time interval of the frame, a channel reservation request to a third UE; receiving, from a first UE, a signal indicating that the first UE is receiving data from a second UE during at least a part of the control portion of the frame; and determining to refrain from transmitting a data signal to the third UE in response to the received signal indicating the first UE is receiving data from a second UE.

Aspect 27: The method of aspect 26, wherein the frame comprises a first frame, and determining to refrain from transmitting the data signal comprises: determining to refrain from transmitting the data signal to the third UE in a second frame.

Aspect 28: The method of any of aspects 26 through 27, wherein the received signal indicating that the first UE is receiving data from the second UE comprises a predetermined sequence.

Aspect 29: The method of any of aspects 26 through 28, wherein each control region of the plurality of control regions corresponds to a priority level of a set of priority levels.

Aspect 30: The method of any of aspects 26 through 29, wherein the sidelink connection is in an unlicensed radio frequency spectrum band or a shared licensed radio frequency spectrum band.

Aspect 31: An apparatus for wireless communications at a first UE, comprising a processor; memory coupled with the processor; and instructions stored in the memory and executable by the processor to cause the apparatus to perform a method of any of aspects 1 through 16.

Aspect 32: An apparatus for wireless communications at a first UE, comprising at least one means for performing a method of any of aspects 1 through 16.

Aspect 33: A non-transitory computer-readable medium storing code for wireless communications at a first UE, the code comprising instructions executable by a processor to perform a method of any of aspects 1 through 16.

Aspect 34: An apparatus for wireless communications at a second UE, comprising a processor; memory coupled with the processor; and instructions stored in the memory and executable by the processor to cause the apparatus to perform a method of any of aspects 17 through 20.

Aspect 35: An apparatus for wireless communications at a second UE, comprising at least one means for performing a method of any of aspects 17 through 20.

Aspect 36: A non-transitory computer-readable medium storing code for wireless communications at a second UE, the code comprising instructions executable by a processor to perform a method of any of aspects 17 through 20.

Aspect 37: An apparatus for wireless communications at a third UE, comprising a processor; memory coupled with the processor; and instructions stored in the memory and executable by the processor to cause the apparatus to perform a method of any of aspects 21 through 25.

Aspect 38: An apparatus for wireless communications at a third UE, comprising at least one means for performing a method of any of aspects 21 through 25.

Aspect 39: A non-transitory computer-readable medium storing code for wireless communications at a third UE, the code comprising instructions executable by a processor to perform a method of any of aspects 21 through 25.

Aspect 40: An apparatus for wireless communications at a fourth user equipment, comprising a processor; memory coupled with the processor; and instructions stored in the memory and executable by the processor to cause the apparatus to perform a method of any of aspects 26 through 30.

Aspect 41: An apparatus for wireless communications at a fourth user equipment, comprising at least one means for performing a method of any of aspects 26 through 30.

Aspect 42: A non-transitory computer-readable medium storing code for wireless communications at a fourth user equipment, the code comprising instructions executable by a processor to perform a method of any of aspects 26 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
    identifying, for a sidelink connection, a frame comprising a control portion and a data portion that is associated with the control portion, the control portion comprising a plurality of control regions, each control region comprising a first transmission time interval for channel reservation requests for a group of UEs and a second transmission time interval for channel reservation responses for the group of UEs;

determining that a second UE has obtained access to the sidelink connection for communications with the first UE in a first instance of the frame; and receiving, from the second UE, a data signal in the data portion of the first instance of the frame and in at least a part of the control portion of a second instance of the frame that follows the first instance.

2. The method of claim 1, further comprising:
determining, in the at least a part of the control portion of the second instance of the frame, a presence of interference on the sidelink connection; and
transmitting, based at least in part on determining the presence of the interference, a signal indicating that the first UE is receiving data from the second UE.

3. The method of claim 2, further comprising:
determining that a level of the interference satisfies an interference threshold, wherein the signal indicating that the first UE is receiving data from the second UE is transmitted based at least in part on the level of the interference satisfying the interference threshold.

4. The method of claim 2, further comprising:
receiving, at the first UE, a channel reservation request addressed to a third UE and from a fourth UE, wherein the presence of the interference is determined based at least in part on the received channel reservation request.

5. The method of claim 4, wherein the channel reservation request and the data signal are received at least in part during a same time interval.

6. The method of claim 2, further comprising:
switching from a receive mode to a transmit mode based at least in part on determining the presence of the interference, the signal indicating that the first UE is receiving data from the second UE transmitted in the transmit mode.

7. The method of claim 2, further comprising:
identifying a length of the signal indicating that the first UE is receiving data from the second UE based at least in part on the interference.

8. The method of claim 7, further comprising:
determining a receive power for the interference, the length of the signal determined based at least in part on the determined receive power for the interference.

9. The method of claim 2, wherein the signal indicating that the first UE is receiving data from the second UE comprises a predetermined sequence.

10. The method of claim 1, wherein determining that the second UE has obtained access to the sidelink connection for communications with the first UE comprises:
receiving, from the second UE, a channel reservation request addressing the first UE.

11. The method of claim 10, further comprising:
transmitting, in response to the received channel reservation request, a channel reservation response addressing the second UE.

12. The method of claim 1, wherein each control region of the plurality of control regions corresponds to a priority level of a set of priority levels.

13. The method of claim 1, wherein the sidelink connection is in an unlicensed radio frequency spectrum band.

14. The method of claim 1, wherein the sidelink connection is in a shared licensed radio frequency spectrum band.

15. The method of claim 1, wherein the first UE lacks an access link to a base station.

16. The method of claim 1, wherein the sidelink connection comprises a PC5 vehicle-to-vehicle interface of a cellular network.

17. A method for wireless communications at a second user equipment (UE), comprising:
identifying, for a sidelink connection, a frame comprising a control portion and a data portion that is associated with the control portion, the control portion comprising a plurality of control regions, each control region comprising a first transmission time interval for channel reservation requests for a group of UEs and a second transmission time interval for channel reservation responses for the group of UEs;
obtaining access to the sidelink connection based at least in part on a successful channel access procedure in a first instance of the frame; and
transmitting, to a first UE, a data signal in the data portion of the first instance of the frame and in at least a part of the control portion of a second instance of the frame that follows the first instance.

18. The method of claim 17, further comprising:
transmitting, based at least in part on the obtaining access to the sidelink connection, a channel reservation request addressing the first UE; and
receiving, in response to the transmitted channel reservation request, a channel reservation response from the first UE, the data signal transmitted based at least in part on receiving the channel reservation response.

19. The method of claim 17, wherein each control region of the plurality of control regions corresponds to a priority level of a set of priority levels.

20. The method of claim 17, wherein the sidelink connection is in an unlicensed radio frequency spectrum band or a shared licensed radio frequency spectrum band.

21. A method for wireless communications at a third user equipment (UE), comprising:
identifying, for a sidelink connection, a frame comprising a control portion and a data portion that is associated with the control portion, the control portion comprising a plurality of control regions, each control region comprising a first transmission time interval for channel reservation requests for a group of UEs and a second transmission time interval for channel reservation responses for the group of UEs;
receiving, in the first transmission time interval of the frame, a channel reservation request from a fourth UE;
receiving, from a first UE, a signal indicating that the first UE is receiving data from a second UE during at least a part of the control portion of the frame; and
determining to refrain from transmitting a channel reservation response to the fourth UE in response to the received channel reservation request based at least in part on receiving the signal indicating that the first UE is receiving data from a second UE.

22. The method of claim 21, further comprising:
monitoring for channel reservation requests during the first transmission time interval based at least in part on the identified frame.

23. The method of claim 21, wherein the received signal indicating that the first UE is receiving data from the second UE comprises a predetermined sequence.

24. The method of claim 21, wherein each control region of the plurality of control regions corresponds to a priority level of a set of priority levels.

25. The method of claim 21, wherein the sidelink connection is in an unlicensed radio frequency spectrum band or a shared licensed radio frequency spectrum band.

26. A method for wireless communications at a fourth user equipment, comprising:
- identifying, for a sidelink connection, a frame comprising a control portion and a data portion that is associated with the control portion, the control portion comprising a plurality of control regions, each control region comprising a first transmission time interval for channel reservation requests for a group of UEs and a second transmission time interval for channel reservation responses for the group of UEs;
- transmitting, in the first transmission time interval of the frame, a channel reservation request to a third UE;
- receiving, from a first UE, a signal indicating that the first UE is receiving data from a second UE during at least a part of the control portion of the frame; and
- determining to refrain from transmitting a data signal to the third UE in response to the received signal indicating the first UE is receiving data from a second UE.

27. The method of claim 26, wherein the frame comprises a first frame, and determining to refrain from transmitting the data signal comprises:
- determining to refrain from transmitting the data signal to the third UE in a second frame.

28. The method of claim 26, wherein the received signal indicating that the first UE is receiving data from the second UE comprises a predetermined sequence.

29. The method of claim 26, wherein each control region of the plurality of control regions corresponds to a priority level of a set of priority levels.

30. The method of claim 26, wherein the sidelink connection is in an unlicensed radio frequency spectrum band or a shared licensed radio frequency spectrum band.

* * * * *